United States Patent
Tsubata et al.

(10) Patent No.: US 8,586,938 B2
(45) Date of Patent: Nov. 19, 2013

(54) ULTRAVIOLET RAY MEASURING APPARATUS AND ELECTRONIC WRISTWATCH EQUIPPED WITH ULTRAVIOLET RAY MEASURING FUNCTION

(75) Inventors: Keisuke Tsubata, Chiba (JP); Tomohiro Ihashi, Chiba (JP); Satoshi Sakai, Chiba (JP); Hisao Nakamura, Chiba (JP); Eriko Noguchi, Chiba (JP); Kazuo Kato, Chiba (JP); Yoshinori Sugai, Chiba (JP)

(73) Assignee: Seiko Instruments Inc. (JP)

( * ) Notice: Subject to any disclaimer, the term of this patent is extended or adjusted under 35 U.S.C. 154(b) by 293 days.

(21) Appl. No.: 12/932,575

(22) Filed: Feb. 28, 2011

(65) Prior Publication Data

US 2011/0222375 A1    Sep. 15, 2011

(30) Foreign Application Priority Data

Mar. 15, 2010  (JP) ................. 2010-058433
Apr. 13, 2010  (JP) ................. 2010-092630
Apr. 16, 2010  (JP) ................. 2010-095517
Jun. 3, 2010   (JP) ................. 2010-128281
Jan. 19, 2011  (JP) ................. 2011-008915

(51) Int. Cl.
  *G01J 1/42*     (2006.01)

(52) U.S. Cl.
  USPC ........................................ 250/372

(58) Field of Classification Search
  USPC ........................................ 250/372
  See application file for complete search history.

(56) References Cited

U.S. PATENT DOCUMENTS 8,044,363 B2 * 10/2011 Ales et al. ............. 250/372
2003/0150998 A1 * 8/2003 Shin et al. ............. 250/372

FOREIGN PATENT DOCUMENTS

JP    2 16031   2/1990
JP    2 60828   5/1990
JP    6 51837   7/1994

OTHER PUBLICATIONS

Abstract, publication No. JP1262426, publication date Oct. 19, 1989.
Abstract, publication No. JP2001255205, publication date Sep. 21, 2001.

* cited by examiner

*Primary Examiner* — David Porta
*Assistant Examiner* — Hugh H Maupin
(74) *Attorney, Agent, or Firm* — Adams & Wilks

(57) ABSTRACT

The ultraviolet ray sensor measures the intensity of ultraviolet rays irradiated to the ultraviolet ray receiving surface. The CPU performs control to measure ultraviolet intensity in a case in which the ultraviolet ray receiving surface of the ultraviolet ray sensor faces in a predetermined direction.

9 Claims, 19 Drawing Sheets

ULTRAVIOLET RAY MEASURING APPARATUS AND ELECTRONIC WRISTWATCH EQUIPPED WITH ULTRAVIOLET RAY MEASURING FUNCTION

BACKGROUND OF THE INVENTION

1. Field of the Invention

The present invention relates to an ultraviolet ray measuring apparatus and an electronic wristwatch equipped with an ultraviolet ray measuring function.

2. Background Art

In the past, electronic devices equipped with an ultraviolet ray measuring function were known that included an ultraviolet ray sensor and measured ultraviolet intensity and displayed measurement results (for example, refer to JP-UM-A-6-51837, JP-UM-A-2-60828, and JP-UM-A-2-16031). In addition, in electronic devices that measure the amount of ultraviolet rays, it is common that measurement is started by pressing a start switch that gives a command for the measurement of ultraviolet rays.

In addition, as electronic devices equipped with an ultraviolet ray measuring function in the related art, electronic devices are known that are configured to display instantaneous values when measuring ultraviolet intensity, or cumulative values of ultraviolet intensity measured (for example, refer to JP-A-2001-255205 and JP-1-262426), or average values of ultraviolet intensity measured (for example, refer to JP-UM-A-6-51837). In addition, with regard to the suppression of current consumed, technologies are known that "set the ultraviolet intensity measuring time to a specific time" (for example, refer to JP-UM-A-2-16031).

Ultraviolet ray sensors output the maximum value when facing the sun, and therefore, if not facing the sun, the intensity of ultraviolet rays cannot be measured accurately. However, in a case in which an ultraviolet ray measuring function is provided in devices that are worn on the body, such as a pedometer, a wristwatch or the like, hanging from the neck, or in small-sized mobile ultraviolet ray measuring devices in the related art, the direction of the devices is not fixed and therefore the direction of the ultraviolet ray sensor varies with each use. As a result, there are cases in which the ultraviolet ray receiving surface of the ultraviolet ray sensor does not face the sun, and thus there is a problem in that it is difficult to accurately measure ultraviolet intensity. For example, in a case in which the ultraviolet ray receiving surface of the ultraviolet ray sensor faces downward, there is a problem in that, although the actual amount of ultraviolet rays from the sun is high, the sensor determines that the amount of ultraviolet rays is low or there are no ultraviolet rays.

SUMMARY OF THE INVENTION

It is an aspect of the present application to provide an ultraviolet ray measuring apparatus and an electronic wristwatch equipped with an ultraviolet ray measuring function capable of accurately measuring ultraviolet intensity.

The present application is an ultraviolet ray measuring apparatus including an ultraviolet ray sensor that measures the ultraviolet intensity of ultraviolet rays irradiated to an ultraviolet ray receiving surface and a control unit that performs control to measure the ultraviolet intensity in a case in which the ultraviolet ray receiving surface of the ultraviolet ray sensor faces in a predetermined direction.

In addition, the present application is an ultraviolet ray measuring apparatus including an ultraviolet ray sensor that measures the ultraviolet intensity of ultraviolet rays irradiated to an ultraviolet ray receiving surface, a orientation detecting unit that detects the direction of the ultraviolet ray receiving surface, a display unit that displays information showing the ultraviolet intensity measured by the ultraviolet ray sensor, and a control unit that, based on the detection results by the orientation detecting unit, controls the ultraviolet ray sensor to measure the ultraviolet intensity in a case in which the ultraviolet ray receiving surface is determined to be facing upward and controls the ultraviolet ray sensor to stop operation in a case in which the ultraviolet ray receiving surface is determined to not be facing upward.

In addition, in the ultraviolet ray measuring apparatus of the present application, the control unit activates the ultraviolet ray sensor for a fixed period at a fixed interval when controlling the ultraviolet ray sensor to measure the ultraviolet intensity.

In addition, in the ultraviolet ray measuring apparatus of the present application, the control unit performs the above control only when a fixed amount of time elapses after the ultraviolet ray sensor is controlled to measure the ultraviolet intensity.

In addition, in the ultraviolet ray measuring apparatus of the present application, the control unit performs the above control only in a case in which a fixed amount of time elapses after the ultraviolet ray sensor is controlled to measure the ultraviolet intensity or in which the previous ultraviolet intensity measured by the ultraviolet ray sensor is below a reference value and a reference amount of time or longer elapses from the measurement.

In addition, the present application is an ultraviolet ray measuring apparatus including an ultraviolet ray sensor that measures the ultraviolet intensity of ultraviolet rays irradiated to an ultraviolet ray receiving surface, a solar power generation unit that generates power according to light irradiated to a light receiving surface disposed in almost the same direction as the ultraviolet ray receiving surface, a generated power amount measuring unit that measures the amount of power generated by the solar power generation unit, a display unit that displays information showing the ultraviolet intensity measured by the ultraviolet ray sensor, and a control unit that controls the ultraviolet ray sensor to measure the ultraviolet intensity in a case in which the amount of power generated by the solar power generation unit is equal to or higher than a predetermined value and controls the ultraviolet ray sensor to stop the operation in a case in which the amount of power generated by the solar power generation unit is less than a predetermined value.

In addition, in the ultraviolet ray measuring apparatus of the present application, the control unit activates the ultraviolet ray sensor for a fixed period at a fixed interval when controlling the ultraviolet ray sensor to measure the ultraviolet intensity.

In addition, in the ultraviolet ray measuring apparatus of the present application, the control unit performs the above control only in a case in which a fixed amount of time elapses after the ultraviolet ray sensor is controlled to measure the ultraviolet intensity.

In addition, in the ultraviolet ray measuring apparatus of the present application, the control unit performs the above control only in a case in which a fixed amount of time elapses after the ultraviolet ray sensor is controlled to measure the ultraviolet intensity or in which the previous ultraviolet intensity measured by the ultraviolet ray sensor is below a reference value, and a reference amount of time or longer elapses.

In addition, in the ultraviolet ray measuring apparatus of the present application, the control unit performs the above control only in a case in which a fixed amount of time elapses after the ultraviolet ray sensor is controlled to measure the ultraviolet intensity or in which the amount of power generated by the solar power generation unit is increased by a fixed amount or more from the amount of power generated by the solar power generation unit when the ultraviolet ray sensor was controlled to measure the previous ultraviolet intensity.

In addition, the present application is an ultraviolet ray measuring apparatus including an ultraviolet ray sensor that measures the ultraviolet intensity of ultraviolet rays irradiated to an ultraviolet ray receiving surface, a light detecting unit that includes a light receiving surface disposed in almost the same direction as the ultraviolet ray receiving surface and detects that the light receiving surface is facing a light source based on the intensity of light irradiated to the light receiving surface, a display unit that displays information showing the ultraviolet intensity measured by the ultraviolet ray sensor, and a control unit that controls the ultraviolet ray sensor to measure the ultraviolet intensity in a case in which the light detecting unit detects that the light receiving surface is facing a light source.

In addition, in the ultraviolet ray measuring apparatus of the present application, the light detecting unit has a light impermeable material configured above the light receiving surface so that light is irradiated to the light receiving surface without being blocked in a case in which the light receiving surface is facing a light source and a member with a fine cylindrical light passage disposed therein, and detects that the light receiving surface is facing a light source in a case in which the intensity of light irradiated to the light receiving surface is strong.

In addition, in the ultraviolet ray measuring apparatus of the present application, the light detecting unit includes a first light receiving surface and a second light receiving surface, both of which are disposed in almost the same direction, and a light impermeable member disposed above the second light receiving surface so that, in a case in which the first light receiving surface and the second light receiving surface face a light source, light irradiated to the first light receiving surface is not blocked but light irradiated to the second light receiving surface is blocked, and detects that the first light receiving surface and the second light receiving surface face a light source in a case in which the intensity of light irradiated to the first light receiving surface is strong and the intensity of light irradiated to the second light receiving surface is weak.

In addition, the present application is an ultraviolet ray measuring apparatus including a notification sound unit that outputs a sound notifying as to whether or not the ultraviolet ray sensor has measured the ultraviolet intensity.

In addition, the present application is an ultraviolet ray measuring apparatus including an ultraviolet ray sensor that measures the ultraviolet intensity of ultraviolet rays irradiated to an ultraviolet ray receiving surface, a first solar power generation unit that generates power according to light irradiated to a first light receiving surface disposed in almost the same direction as the ultraviolet ray receiving surface, a second solar power generation unit that generates power according to light irradiated to a second light receiving surface disposed in almost the same direction as the ultraviolet ray receiving surface, an exterior case that, in a case in which a light source is present in a first direction which is a direction inclined with respect to the first light receiving surface, blocks a part of the light from the light source so that the part of the light is not irradiated to the first light receiving surface and, in a case in which a light source is present in a second direction, which is a direction inclined with respect to the second light receiving surface and different from the first direction, blocks a part of the light from the light source so that the part of the light is not irradiated to the second light receiving surface, and a control unit that controls the ultraviolet ray sensor to measure the ultraviolet intensity in a case in which the power generated by the first solar power generation unit is identical to the power generated by the second solar power generation unit.

In addition, the present application is an electronic wristwatch equipped with an ultraviolet ray measuring function, which is used with the main body equipped with an ultraviolet intensity measuring function and a clock function attached to the arm, including a timekeeping means that performs timekeeping operations, an input means that performs command operations of at least timekeeping operations by the timekeeping means, a display means that is disposed at a visually recognizable surface side in a state in which the main body is attached to the arm and displays at least timekeeping information from the timekeeping means, an ultraviolet intensity detecting means that is disposed at the surface side and measures the ultraviolet intensity, and a control unit that sets whether or not the command operations by the input means are set to work in cooperation with the ultraviolet intensity measurement by the ultraviolet intensity detecting means.

In addition, in the electronic wristwatch equipped with an ultraviolet ray measuring function, the control means controls the display means to display whether or not the command operations by the input means are set to work in cooperation with the ultraviolet intensity measurement by the ultraviolet intensity detecting means.

In addition, in the electronic wristwatch equipped with an ultraviolet ray measuring function, the input means includes a first, a second and a third input switches, the first input switch has a function that gives a command for switching operation modes, the second input switch has a function that gives a command for the start or stop of timekeeping in a state of displaying a stopwatch, the third input switch has a function that gives a command for the timekeeping of lap time or split time in a state in which the stopwatch performs timekeeping or a command for the resetting of measured values while the stopwatch is not in action, and, furthermore, among the first input switch, the second input switch and the third input switch, an input switch that has been set by the control means to work in cooperation with ultraviolet intensity measurement gives a command for ultraviolet intensity measurement in cooperation with the function possessed by the input switch.

In addition, in the electronic wristwatch equipped with an ultraviolet ray measuring function, an input switch set to work in cooperation with an ultraviolet intensity measurement command is disposed at the right side of the ultraviolet intensity detecting means in a state in which the main body is attached to the arm.

In addition, in the electronic wristwatch equipped with an ultraviolet ray measuring function, the input means has input switches having a function that gives a command for ultraviolet intensity measurement and a function that gives a command for whether or not a predetermined operation is set to work in cooperation with ultraviolet intensity measurement.

According to the present application, the ultraviolet ray sensor measures the ultraviolet intensity of ultraviolet rays irradiated to the ultraviolet ray receiving surface. In addition, the control unit performs control to measure ultraviolet intensity in a case in which the ultraviolet ray receiving surface of the ultraviolet ray sensor faces a predetermined direction. Thereby, it is possible to measure ultraviolet rays when the ultraviolet ray receiving surface of the ultraviolet ray sensor faces a predetermined direction, and therefore it is possible to further accurately measure the intensity of ultraviolet rays.

DETAILED DESCRIPTION OF THE INVENTION

First Embodiment

Figure 1:
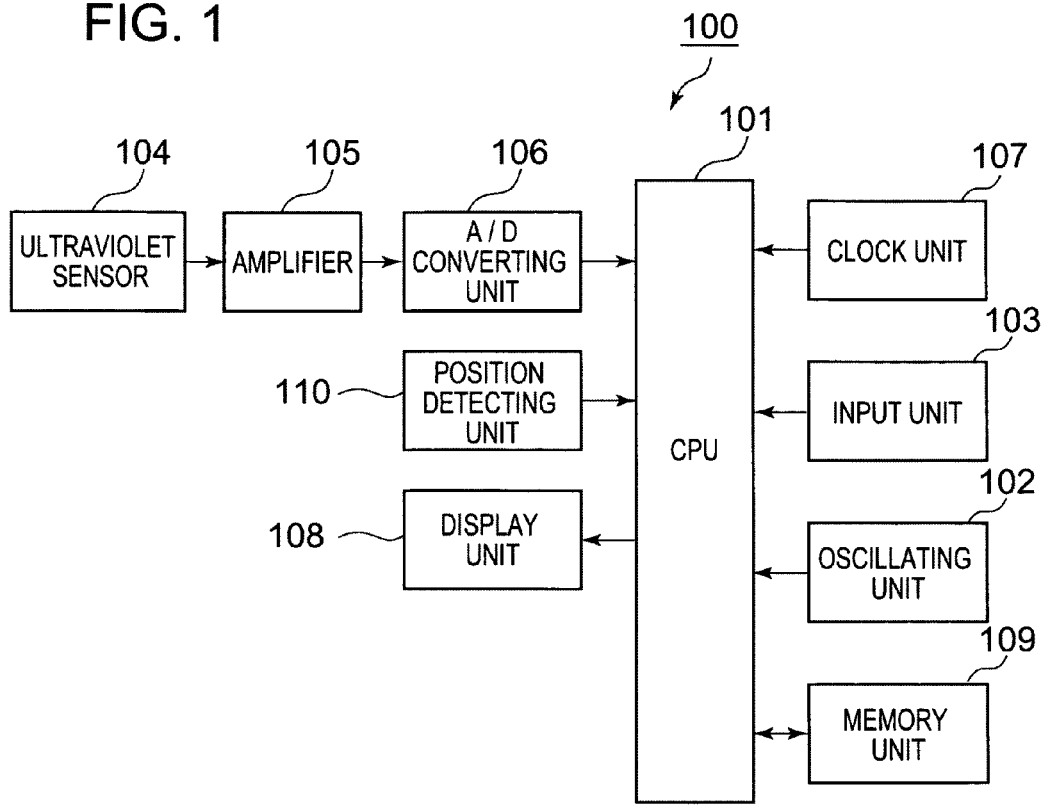
FIG. 1 is a block diagram showing the configuration of an ultraviolet ray measuring apparatus according to a first embodiment of the invention.

Hereinafter, the first embodiment of the invention will be described with reference to the accompanying drawings. FIG. 1 is a block diagram showing the configuration of an ultraviolet ray measuring apparatus according to the embodiment. In the example shown in the drawing, an ultraviolet ray measuring apparatus 100 includes a CPU 101 (a Central Processing Unit, a control unit), an oscillating unit 102, an input unit 103, an ultraviolet ray sensor 104, an amplifying unit 105, an analog-digital (A/D) converting unit 106, a clock unit 107, a display unit 108, a memory unit 109 and an orientation detecting unit 110.

The CPU 101 performs the control of each of the units included in the ultraviolet ray measuring apparatus 100. The oscillating unit 102 outputs reference clock signals for the CPU 101 or clock signals for timekeeping. The input unit 103 is configured with externally operable switches and receives input. The ultraviolet ray sensor 104 includes an ultraviolet ray receiving surface that receives ultraviolet rays and outputs analog signals corresponding to the intensity of ultraviolet rays received (irradiated). The amplifying unit 105 amplifies analog signals output by the ultraviolet ray sensor 104. The A/D converting unit 106 converts analog signals amplified by the amplifying unit 105 to digital signals. The clock unit 107 outputs information showing the current date and time. The display unit 108 displays information showing the intensity of ultraviolet rays measured by the ultraviolet ray sensor 104 (measured values ($\mu W/cm^2$), UV index or the like), the date and time or the like.

The memory unit 109 refers to a Read Only Memory (ROM), a Random Access Memory (RAM) or the like, and stores data used by the ultraviolet ray measuring apparatus 100, such as programs executed by the CPU 101, the intensity of ultraviolet rays measured, the times when the intensity of ultraviolet rays is measured, or the like. The orientation detecting unit 110 refers to an acceleration sensor or the like, and detects the orientation (direction) of the ultraviolet ray receiving surface of the ultraviolet ray sensor 104.

Figure 2:
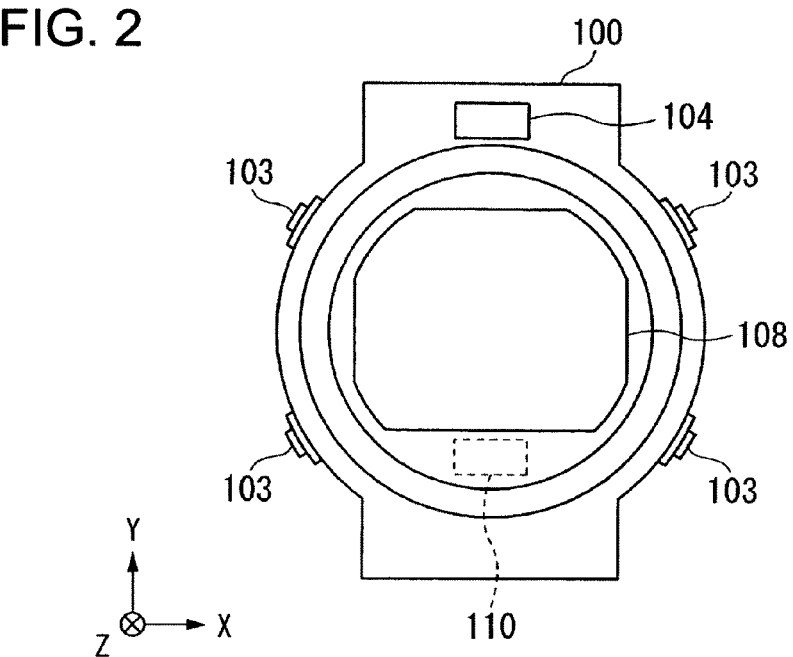
FIG. 2 is a view showing the external appearance of the ultraviolet ray measuring apparatus according to the first embodiment of the invention.

Next, the external appearance of the ultraviolet ray measuring apparatus 100 according to the embodiment will be described. FIG. 2 is a view showing the external appearance of the ultraviolet ray measuring apparatus 100 according to the embodiment. In the example shown in the drawing, the ultraviolet ray measuring apparatus 100 is a wristwatch type apparatus. Hereinafter, the direction from the left side to the right side of the ultraviolet ray measuring apparatus 100 indicates the X axis direction, the direction from the bottom to the top indicates the Y axis direction, and the direction from the front surface to the rear surface indicates the Z axis direction.

On the front surface of the ultraviolet ray measuring apparatus 100, the ultraviolet ray receiving surface of the ultraviolet ray sensor 104 and the display unit 108 are disposed. In addition, the input unit 103 is disposed on a side surface of the ultraviolet ray measuring apparatus 100. In addition, the orientation detecting unit 110 that detects the acceleration in the Z axis direction is disposed on the inner surface of the ultraviolet ray measuring apparatus 100.

As such, in the ultraviolet ray measuring apparatus 100, the ultraviolet ray receiving surface of the ultraviolet ray sensor 104 is disposed as if facing the opposite direction to the Z axis direction. In addition, the ultraviolet ray measuring apparatus 100 includes the orientation detecting unit 110 that detects the acceleration in the Z axis direction. Therefore, the ultraviolet ray measuring apparatus 100 can determine whether or not the ultraviolet ray receiving surface of the ultraviolet ray sensor 104 is facing upward (the sky, in a direction toward the sun, in a predetermined direction) based on the output of the orientation detecting unit 110.

Figure 3:
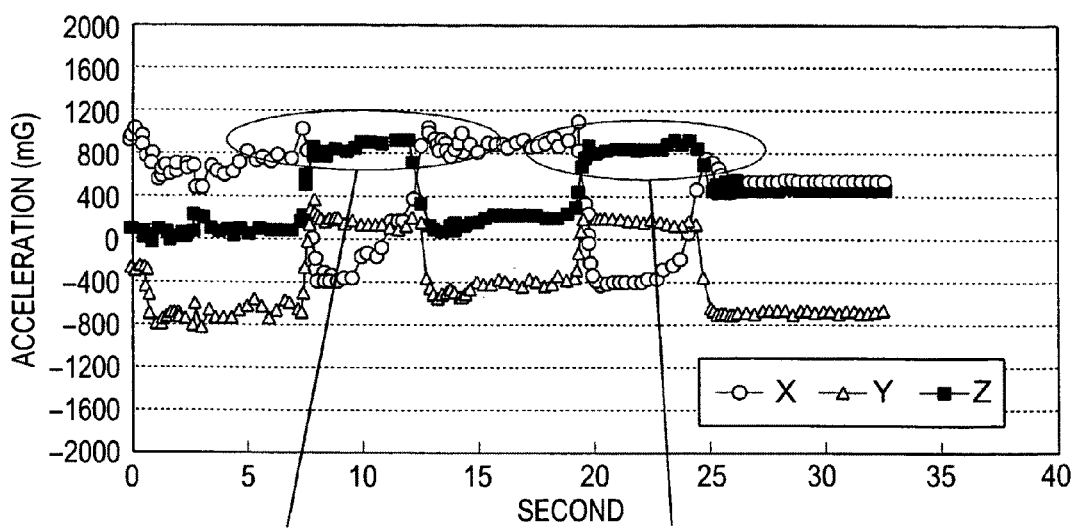
FIG. 3 is a graph showing an output example by the orientation detecting unit in a fixed time period in the first embodiment of the invention.

FIG. 3 is a graph showing an example of the output of the orientation detecting unit 110 in a fixed time period in the embodiment. In the example in the drawing, the orientation detecting unit 110 outputs the acceleration in the X axis direction and the acceleration in the Y axis direction in addition to the acceleration in the Z axis direction. In a case in which the acceleration in the Z axis direction is substantially equal to the acceleration of gravity (1 G=1000 mG), the Z axis direction faces the ground (in the direction of attraction, downward). Therefore, in a case in which the acceleration in the Z axis direction is about 1000 mG, the ultraviolet ray receiving surface of the ultraviolet ray sensor 104 disposed on the front surface of the ultraviolet ray measuring apparatus 100 is facing upward.

In the example shown in the drawing, the acceleration in the Z axis direction is about 1000 mG in time periods of from 6 seconds to 12 seconds and from 20 seconds and 25 seconds. Therefore, it is recognized that the ultraviolet ray receiving surface of the ultraviolet ray sensor 104 is facing the sky (the sun) in time periods of from 6 seconds to 12 seconds and from 20 seconds and 25 seconds.

Figure 4:
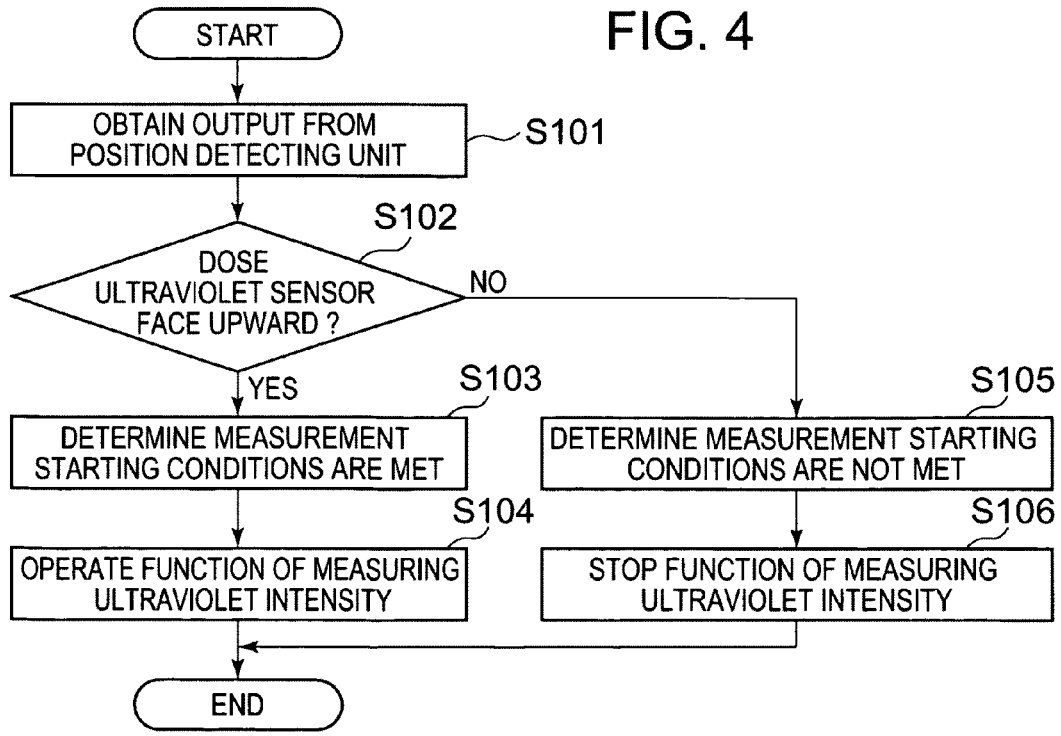
FIG. 4 is a flowchart showing the operations of the ultraviolet ray measuring apparatus according to the first embodiment of the invention.

Next, the operations of the ultraviolet ray measuring apparatus 100 according to the embodiment will be described. FIG. 4 is a flowchart showing the operations of the ultraviolet ray measuring apparatus 100 according to the embodiment.

(Step S101) The CPU 101 obtains the acceleration in the Z axis direction output by the orientation detecting unit 110. After that, the operation proceeds to the process in Step S102.

(Step S102) The CPU 101 determines whether or not the ultraviolet ray receiving surface of the ultraviolet ray sensor 104 is facing upward based on the acceleration in the Z axis direction obtained in Step S101. In a case in which the ultraviolet ray receiving surface of the ultraviolet ray sensor 104 is determined to be facing upward, the operation proceeds to the process in Step S103, and, in other cases, the operation proceeds to the process in Step S105. For example, if the acceleration in the Z axis direction obtained in Step S101 is 1000 mG or higher, the CPU 101 determines that the ultraviolet ray receiving surface of the ultraviolet ray sensor 104 is facing upward.

(Step S103) The CPU 101 determines that conditions for the start of ultraviolet intensity measurement are satisfied. After that, the operation proceeds to the process in Step S104.

(Step S104) The CPU 101 activates the function of measuring ultraviolet intensity and then finishes the process. In detail, the CPU 101 activates the ultraviolet ray sensor 104, the amplifying unit 105 and the A/D converting unit 106. Thereby, the ultraviolet ray sensor 104 outputs analog signals corresponding to the ultraviolet intensity, and the amplifying unit 105 amplifies the analog signals output by the ultraviolet ray sensor 104, and the A/D converting unit 106 converts the analog signals amplified by the amplifying unit 105 to digital signals.

(Step S105) The CPU 101 determines that conditions for the start of ultraviolet intensity measurement are not satisfied. After that, the operation proceeds to the process in Step S106.

(Step S106) The CPU 101 stops the function of measuring ultraviolet intensity and then finishes the process. In detail, the CPU 101 stops the ultraviolet ray sensor 104, the amplifying unit 105 and the A/D converting unit 106. Thereby, it is possible to suppress power consumed by the ultraviolet ray sensor 104, the amplifying unit 105 and the A/D converting unit 106.

As described above, according to the embodiment, the ultraviolet ray measuring apparatus 100 determines whether or not the ultraviolet ray receiving surface of the ultraviolet ray sensor 104 is facing upward based on the output of the orientation detecting unit 110, and activates the function of measuring ultraviolet intensity in a case in which the ultraviolet ray receiving surface of the ultraviolet ray sensor 104 is facing upward and stops the function of measuring ultraviolet intensity in other cases.

Thereby, it is possible to make the ultraviolet ray measuring apparatus 100 automatically perform the measurement of ultraviolet rays in a case in which the ultraviolet ray receiving surface of the ultraviolet ray sensor 104 is facing upward without a user's operation to measure ultraviolet intensity. In addition, since the ultraviolet ray measuring apparatus 100 performs the measurement of ultraviolet intensity in a case in which the ultraviolet ray receiving surface of the ultraviolet ray sensor 104 is facing upward, it is possible to further accurately measure ultraviolet intensity. Furthermore, since the ultraviolet ray measuring apparatus 100 automatically stops the measurement of ultraviolet intensity in a case in which the ultraviolet ray receiving surface of the ultraviolet ray sensor 104 is not facing upward, it is possible to reduce power consumption.

Second Embodiment

Hereinafter, the second embodiment of the invention will be described with reference to the accompanying drawings. The configuration of the ultraviolet ray measuring apparatus 100 of the second embodiment is identical to the configuration of the ultraviolet ray measuring apparatus 100 of the first embodiment. The difference between the ultraviolet ray measuring apparatus 100 of the second embodiment and the ultraviolet ray measuring apparatus 100 of the first embodiment is that the ultraviolet ray measuring apparatus 100 of the second embodiment obtains the ultraviolet intensity for a fixed period at a fixed interval (sampling) and considers the maximum value as the measured value when performing the measurement of ultraviolet intensity. This is for further reducing power consumption by obtaining the ultraviolet intensity at a fixed time interval, instead of obtaining the ultraviolet intensity at all times, when performing the measurement of ultraviolet intensity. Here, the fixed time period and fixed interval, in which the ultraviolet ray measuring apparatus 100 obtains the ultraviolet intensity, may be specified in advance or may be arbitrarily varied by the user.

Figure 5:
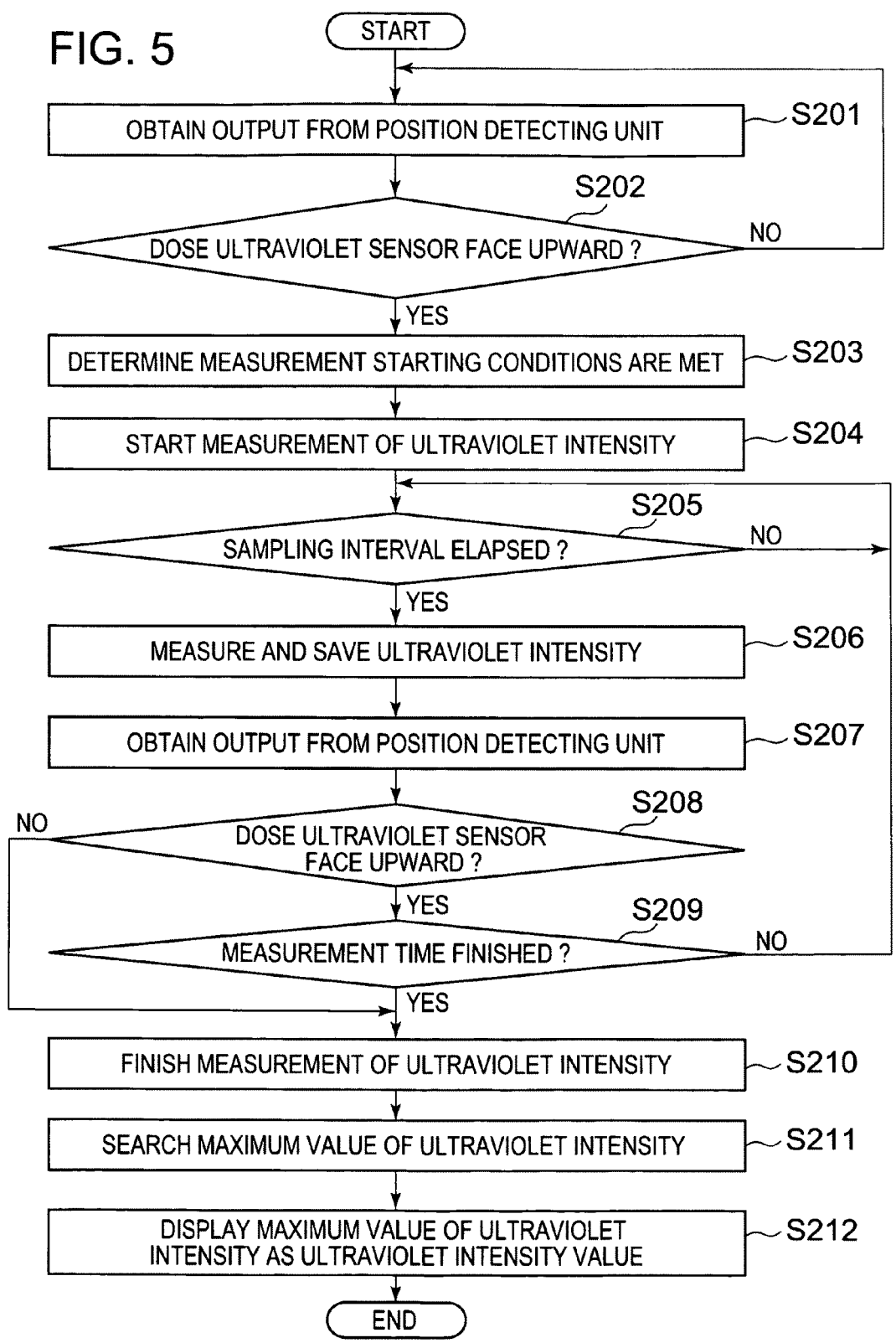
FIG. 5 is a flowchart showing the operations of the ultraviolet ray measuring apparatus according to a second embodiment of the invention.

Next, the operations of the ultraviolet ray measuring apparatus 100 according to the second embodiment will be described. FIG. 5 is a flowchart showing the operations of the ultraviolet ray measuring apparatus 100 according to the embodiment.

(Step S201) The CPU 101 obtains the acceleration in the Z axis direction output using the orientation detecting unit 110. After that, the operation proceeds to the process in Step S202.

(Step S202) The CPU 101 determines whether or not the ultraviolet ray receiving surface of the ultraviolet ray sensor 104 is facing upward based on the acceleration in the Z axis direction obtained in Step S101. In a case in which the ultraviolet ray receiving surface of the ultraviolet ray sensor 104 is determined to be facing upward, the operation proceeds to the process in Step S203, and, in other cases, the operation returns to the process in Step S201.

(Step S203) The CPU 101 determines that conditions for the start of ultraviolet intensity measurement are satisfied. After that, the operation proceeds to the process in Step S204.

(Step S204) The CPU 101 starts the measurement of ultraviolet intensity (the processes in Step S205 to Step S209).

(Step S205) The CPU 101 determines whether or not n seconds (a fixed time interval, for example, 125 ms) has elapsed from the time when the previous ultraviolet intensity was obtained based on the current time output by the clock unit 107 and the time when the previous ultraviolet intensity was obtained, which is stored in the memory unit 109. In a case in which the CPU 101 determines that the current time output by the clock unit 107 is n seconds after the time when the previous ultraviolet intensity was obtained, which is stored in the memory unit 109, the operation proceeds to the process in Step S206, and, in other cases, the process in Step S205 is executed again. Meanwhile, in a case in which the process in Step S205 is performed for the first time, ultraviolet intensity is yet to be obtained, and therefore the operation proceeds to the process in Step S206.

(Step S206) The CPU 101 activates the ultraviolet ray sensor 104, the amplifying unit 105 and the A/D converting unit 106. The ultraviolet ray sensor 104 outputs analog signals corresponding to the ultraviolet intensity. The amplifying unit 105 amplifies the analog signals output by the ultraviolet ray sensor 104. The A/D converting unit 106 converts the analog signals amplified by the amplifying unit 105 to digital signals. The CPU 101 obtains the ultraviolet intensity based on the input digital signals and associates the current time output by the clock unit 107 and the obtained ultraviolet intensity and stores it in the memory unit 109. After that, the operation proceeds to the process in Step S207.

(Step S207) The CPU 101 obtains the acceleration in the Z axis direction output by the orientation detecting unit 110. After that, the operation proceeds to the process in Step S208.

(Step S208) The CPU 101 determines whether or not the ultraviolet ray receiving surface of the ultraviolet ray sensor 104 is facing upward based on the acceleration in the Z axis direction obtained in Step S207. In a case in which the ultraviolet ray receiving surface of the ultraviolet ray sensor 104 is determined to be facing upward, the operation proceeds to the process in Step S209, and, in other cases, the operation proceeds to the process in Step S210.

(Step S209) The CPU 101 determines whether or not m seconds (a fixed time period, for example, 30 seconds) has elapsed from the time when ultraviolet intensity was obtained for the first time based on the current time output by the clock unit 107 and the time when the previous ultraviolet intensity was obtained, which is stored in the memory unit 109. In a case in which the CPU 101 determines that the current time output by the clock unit 107 is m seconds after the time when ultraviolet intensity was obtained for the first time, which is stored in the memory unit 109, the operation proceeds to the process in Step S210, and, in other cases, the operation returns to the process in Step S205.

(Step S210) The CPU 101 finishes the measurement of ultraviolet intensity (the processes in Step S205 to Step S209). After that, the operation proceeds to the process in Step S211.

(Step S211) The CPU 101 searches for the maximum value of the ultraviolet intensities obtained in Step S206. After that, the operation proceeds to the process in Step S212.

(Step S212) The CPU 101 displays the maximum value of the ultraviolet intensities searched for in Step S211 as a measured value of ultraviolet intensity on the display unit 108. After that, the operation is finished.

As described above, according to the second embodiment, the ultraviolet ray measuring apparatus 100 determines whether or not the ultraviolet ray receiving surface of the ultraviolet ray sensor 104 is facing upward based on the output of the orientation detecting unit 110, and measures the ultraviolet intensity only in a case in which the ultraviolet ray receiving surface of the ultraviolet ray sensor 104 is facing upward. In addition, in a case in which the ultraviolet ray measuring apparatus 100 performs the measurement of ultraviolet intensity, ultraviolet intensity is measured for a fixed period at a fixed interval (sampling), and the maximum value of the obtained ultraviolet intensities is considered as a measured value of ultraviolet intensity. Thereby, the number of times when the ultraviolet ray measuring apparatus 100 obtains the ultraviolet intensity is reduced, and therefore it is possible to reduce power consumption.

Third Embodiment

Hereinafter, the third embodiment of the invention will be described with reference to the accompanying drawings. The configuration of the ultraviolet ray measuring apparatus 100 of the third embodiment is identical to the configuration of the ultraviolet ray measuring apparatus 100 of the second embodiment. The difference between the ultraviolet ray measuring apparatus 100 of the third embodiment and the ultraviolet ray measuring apparatus 100 of the second embodiment is that the ultraviolet ray measuring apparatus 100 of the third embodiment starts the next measurement of ultraviolet intensity only in a case in which a fixed time period has elapsed from the previous measurement of ultraviolet intensity. This is for further reducing power consumption by starting the measurement of ultraviolet intensity every fixed time period since ultraviolet intensity is not frequently changed. Here, the time interval (a fixed time period), at which the ultraviolet ray measuring apparatus 100 starts the measurement of ultraviolet intensity, may be specified in advance or may be arbitrarily varied by the user.

Figure 6:
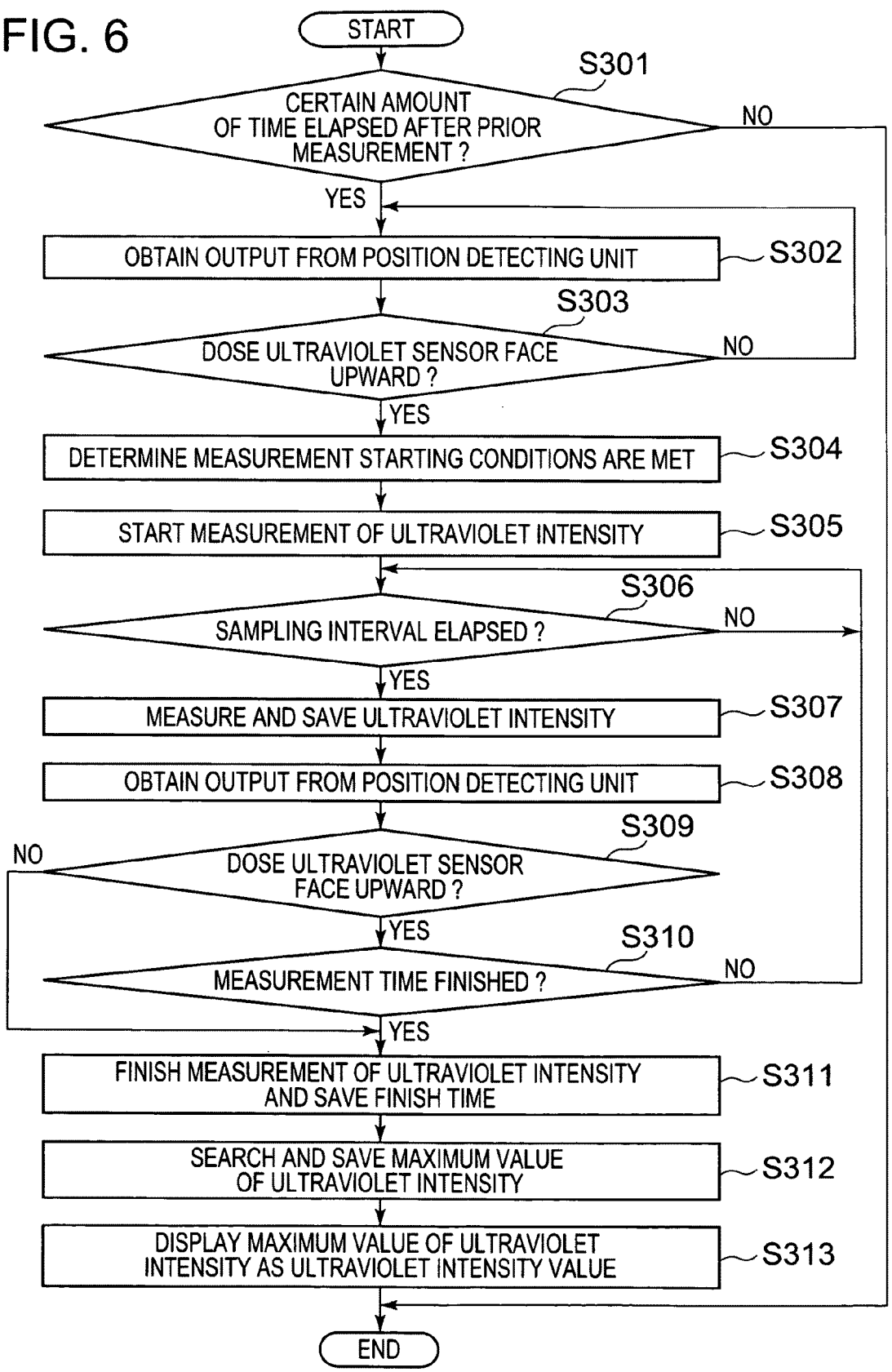
FIG. 6 is a flowchart showing the operations of the ultraviolet ray measuring apparatus according to a third embodiment of the invention.

Next, the operations of the ultraviolet ray measuring apparatus 100 according to the third embodiment will be described. FIG. 6 is a flowchart showing the operations of the ultraviolet ray measuring apparatus 100 according to the embodiment.

(Step S301) The CPU 101 determines whether or not the current time output by the clock unit 107 is x minutes (a fixed time period, for example, 30 minutes) after the time when the previous measurement of ultraviolet intensity was finished, which is stored in the memory unit 109. In a case in which the CPU 101 determines that the current time output by the clock unit 107 is x minutes after the time when the previous measurement of ultraviolet intensity was finished, which is stored in the memory unit 109, the operation proceeds to the process in Step S302, and, in other cases, the operation is finished. Meanwhile, in a case in which no measurement of ultraviolet intensity has been performed, the operation proceeds to the process in Step S302.

The processes in Step S302 to Step S310 are identical to the processes in Step S201 to Step S209 in the second embodiment.

(Step S311) The CPU 101 finishes the measurement of ultraviolet intensity (the processes in Step S306 to Step S310) and stores the current time output by the clock unit 107 as the time when the measurement of ultraviolet intensity is finished in the memory unit 109. After that, the operation proceeds to the process in Step S312.

(Step S312) The CPU 101 searches for the maximum value of the ultraviolet intensities obtained in Step S307. After that, the operation proceeds to the process in Step S313.

(Step S313) The CPU 101 displays the maximum value of the ultraviolet intensities searched for in Step S312 as a measured value of ultraviolet intensity on the display unit 108. After that, the operation is finished.

As described above, according to the third embodiment, the ultraviolet ray measuring apparatus 100 determines whether or not the ultraviolet ray receiving surface of the ultraviolet ray sensor 104 is facing upward based on the output of the orientation detecting unit 110, and measures the ultraviolet intensity only in a case in which the ultraviolet ray receiving surface of the ultraviolet ray sensor 104 is facing upward. In addition, the ultraviolet ray measuring apparatus 100 obtains the ultraviolet intensity for a fixed period at a fixed interval (sampling) and considers the maximum value of the obtained ultraviolet intensities as a measured value of ultraviolet intensity when performing the measurement of ultraviolet intensity. In addition, the ultraviolet ray measuring apparatus 100 starts the next measurement of ultraviolet intensity only in a case in which a fixed time period has elapsed from the previous measurement of ultraviolet intensity. Thereby, the number of times when the ultraviolet ray measuring apparatus 100 measures the ultraviolet intensity is reduced, and therefore it is possible to further reduce power consumption.

Fourth Embodiment

Hereinafter, the fourth embodiment of the invention will be described with reference to the accompanying drawings. The configuration of the ultraviolet ray measuring apparatus 100 of the fourth embodiment is identical to the configuration of the ultraviolet ray measuring apparatus 100 of the third embodiment. The difference between the ultraviolet ray measuring apparatus 100 of the fourth embodiment and the ultraviolet ray measuring apparatus 100 of the third embodiment is that the ultraviolet ray measuring apparatus 100 of the fourth embodiment starts the next measurement of ultraviolet intensity when the previously measured ultraviolet intensity is below a reference value and a reference amount of time has elapsed from the previous measurement of ultraviolet intensity even in a case in which a fixed time period has not elapsed from the previous measurement of ultraviolet intensity.

This is because, in a case in which ultraviolet rays are measured when ultraviolet intensity is weak, such as when the sun is hidden behind a cloud unexpectedly or the like, the ultraviolet intensity significantly differs from the ultraviolet intensity when ultraviolet intensity is strong, such as when the sun is not hidden behind a cloud or the like. Therefore, in a case in which the previously measured ultraviolet intensity is below a reference value, by shortening the amount of time (a reference amount of time) until the ultraviolet intensity is measured again, it is possible to perform the measurement of ultraviolet intensity without damaging a user's sense of usefulness. Here, in a case in which the previously measured ultraviolet intensity is below the reference value, the amount of time (the reference amount of time) until the ultraviolet ray measuring apparatus 100 measures the ultraviolet intensity again may be specified in advance or may be arbitrarily varied by the user.

Figure 7:
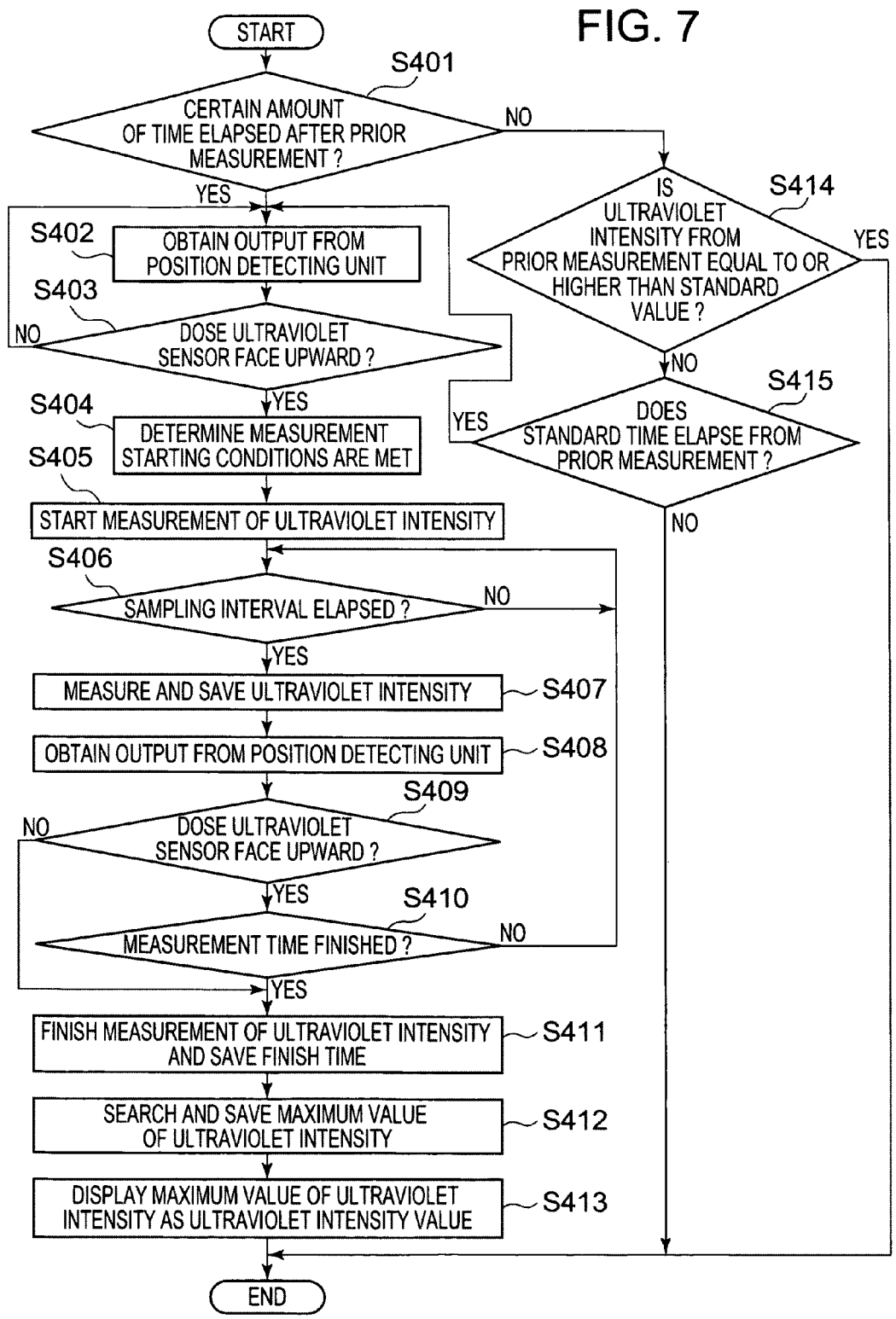
FIG. 7 is a flowchart showing the operations of the ultraviolet ray measuring apparatus according to a fourth embodiment of the invention.

Next, the operations of the ultraviolet ray measuring apparatus 100 according to the fourth embodiment will be described. FIG. 7 is a flowchart showing the operations of the ultraviolet ray measuring apparatus 100 according to the embodiment.

(Step S401) The CPU 101 determines whether or not the current time output by the clock unit 107 is x minutes (a fixed time period, for example, 30 minutes) after the time when the previous measurement of ultraviolet intensity was finished, which is stored in the memory unit 109. In a case in which the CPU 101 determines that the current time output by the clock unit 107 is x minutes after the time when the previous measurement of ultraviolet intensity was finished, which is stored in the memory unit 109, the operation proceeds to the process in Step S402, and, in other cases, the operation proceeds to the process in Step S414. Meanwhile, in a case in which no measurement of ultraviolet intensity has been performed, the operation proceeds to the process in Step S402.

The processes in Step S402 to Step S411 are identical to the processes in Step S302 to Step S311 in the third embodiment.

(Step S412) The CPU 101 searches for the maximum value of the ultraviolet intensities obtained in Step S407. Subsequently, the CPU 101 associates the maximum value of ultraviolet intensity searched for to the time when the measurement of ultraviolet intensity was finished, which was stored in the memory unit 109 in Step S411, and stores it in the memory unit 109. After that, the operation proceeds to the process in Step S413.

(Step S413) The CPU 101 displays the maximum value of the ultraviolet intensities searched for in Step S412 as a measured value of ultraviolet intensity on the display unit 108. After that, the operation is finished.

(Step S414) The CPU 101 determines whether or not the ultraviolet intensity of when the previous ultraviolet intensity stored in the memory unit 109 was measured is below the reference value. In a case where the CPU 101 determines that the ultraviolet intensity of the previous ultraviolet intensity measurement is equal to or higher than the reference value, the operation is finished, and, in other cases, the operation proceeds to the process in Step S415.

(Step S415) The CPU 101 determines whether or not the current time output by the clock unit 107 is y minutes (the reference amount of time, for example, 10 minutes) after the time when the previous measurement of ultraviolet intensity was finished, which is stored in the memory unit 109. In a case in which the CPU 101 determines that the current time output by the clock unit 107 is y minutes after the time when the previous measurement of ultraviolet intensity was finished, which is stored in the memory unit 109, the operation returns to the process in Step S402, and, in other cases, the operation is finished.

As described above, according to the fourth embodiment, the ultraviolet ray measuring apparatus 100 determines whether or not the ultraviolet ray receiving surface of the ultraviolet ray sensor 104 is facing upward based on the output of the orientation detecting unit 110, and measures the ultraviolet intensity only in a case in which the ultraviolet ray receiving surface of the ultraviolet ray sensor 104 is facing upward. In addition, the ultraviolet ray measuring apparatus 100 obtains the ultraviolet intensity for a fixed period at a fixed interval (sampling) and considers the maximum value of the obtained ultraviolet intensities as a measured value of ultraviolet intensity when performing the measurement of ultraviolet intensity. In addition, the ultraviolet ray measuring apparatus 100 starts the next measurement of ultraviolet intensity when the previously measured ultraviolet intensity is below the reference value and the reference amount of time has elapsed from the previous measurement of ultraviolet intensity even in a case in which a fixed time period has not elapsed from the previous measurement of ultraviolet intensity. Thereby, it is possible to perform the measurement of ultraviolet intensity without damaging a user's sense of usefulness.

Meanwhile, all or part of the functions by each component included in the ultraviolet ray measuring apparatus 100 in the first to fourth embodiments may be realized by recording programs for realizing such functions in a computer-readable recording medium, and reading and executing the program recorded in the recording medium via a computer system. Here, the "computer system" includes hardware, such as an operating system, a peripheral device or the like.

In addition, the "computer-readable recording medium" refers to a transportable medium, such as a flexible disc, a magneto-optical disc, a ROM, a CD-ROM or the like, and a storage unit embedded in a computer, such as a hard disk or the like. Furthermore, the "computer-readable recording medium" may also include an object that dynamically holds a program for a short amount of time, such as communication wires when transmitting the program via a network circuit, such as the Internet or the like, or a communication line, such as a telephone line or the like, or an object that holds a program at a certain point in time, such as a volatile memory inside a computer system, which becomes a server or a client in such a case. In addition, the program may be an object for realizing a part of the above functions or may by an object that can realize the above functions by combining with a program already recorded in a computer system.

Thus far, the first to fourth embodiments of the invention have been described, but the invention is not limited to the embodiments, and a variety of modifications can be added within the scope of the invention. For example, the ultraviolet ray measuring apparatus 100 may be, instead of a wristwatch type apparatus, a small size apparatus which can be easily carried. In addition, the ultraviolet ray measuring apparatus 100 may be incorporated into other electronic devices, such as a pedometer or the like. In addition, the orientation detecting unit 110 has been described with an example of a configuration including an acceleration sensor that measures the acceleration in the Z axis direction, but the orientation detecting unit 110 is not limited thereto. For example, the orientation detecting unit 110 may have any configuration as long as the configuration can detect that the ultraviolet ray receiving surface of the ultraviolet ray sensor 104 is facing upward, such as a tilt switch.

Fifth Embodiment

Hereinafter, the fifth embodiment of the invention will be described with reference to the accompanying drawings.

Figure 8:
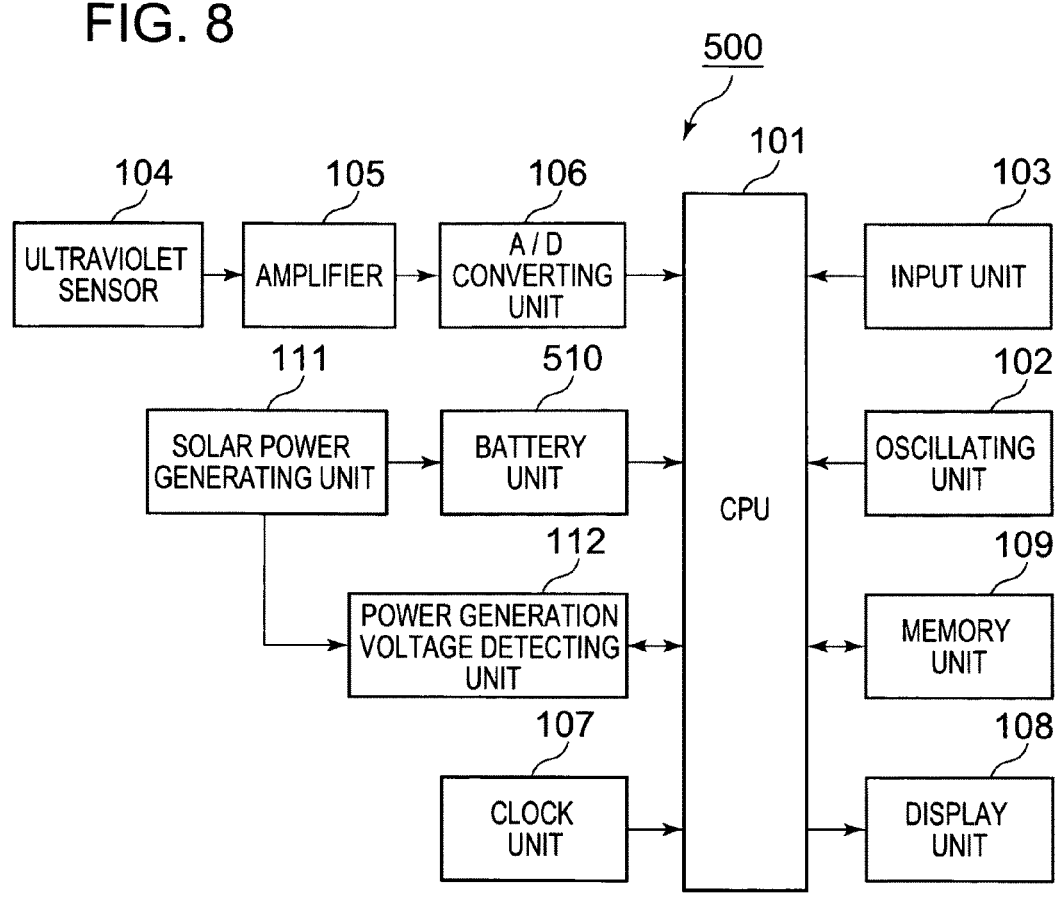
FIG. 8 is a block diagram showing the configuration of an ultraviolet ray measuring apparatus according to a fifth embodiment of the invention.

FIG. 8 is a block diagram showing the configuration of an ultraviolet ray measuring apparatus according to the fifth embodiment. In the example shown in the drawing, an ultraviolet ray measuring apparatus 500 includes the CPU 101 (Central Processing Unit, a control unit), the oscillating unit 102, the input unit 103, the ultraviolet ray sensor 104, the amplifying unit 105, the analog u digital (A/D) converting unit 106, the clock unit 107, the display unit 108, the memory unit 109, a battery unit 510, the solar power generation unit 111 and a power generation voltage detecting unit 112.

The CPU 101 performs the control of each of the units included in the ultraviolet ray measuring apparatus 500. The oscillating unit 102 outputs reference clock signals for the CPU 101 or clock signals for timekeeping. The input unit 103 is configured with externally operable switches and receives input. The ultraviolet ray sensor 104 includes an ultraviolet ray receiving surface that receives ultraviolet ray and outputs analog signals corresponding to the intensity of ultraviolet rays received (irradiated). The amplifying unit 105 amplifies analog signals output by the ultraviolet ray sensor 104. The A/D converting unit 106 converts analog signals amplified by the amplifying unit 105 to digital signals. The clock unit 107 outputs information showing the current date and time. The display unit 108 displays information showing the intensity of ultraviolet rays measured by the ultraviolet ray sensor 104 (measured values ($\mu W/cm^2$), UV index or the like), the date and time or the like.

The memory unit 109 refers to a Read Only Memory (ROM), a Random Access Memory (RAM) or the like, and stores data used by the ultraviolet ray measuring apparatus 500, such as programs executed by the CPU 101, the intensity of ultraviolet rays measured, times when the intensity of ultraviolet rays is measured, or the like. The battery unit 510 is a chargeable secondary battery that supplies power to each of the units included in the ultraviolet ray measuring apparatus 500. The solar power generation unit 111 is a solar cell including a light receiving surface that receives light and generates power according to the received (irradiated) light and charges the battery unit 510. The power generation voltage detecting unit 112 (a generated power amount measuring unit) detects voltages generated by the solar power generation unit 111 (generated power amount).

Figure 9:
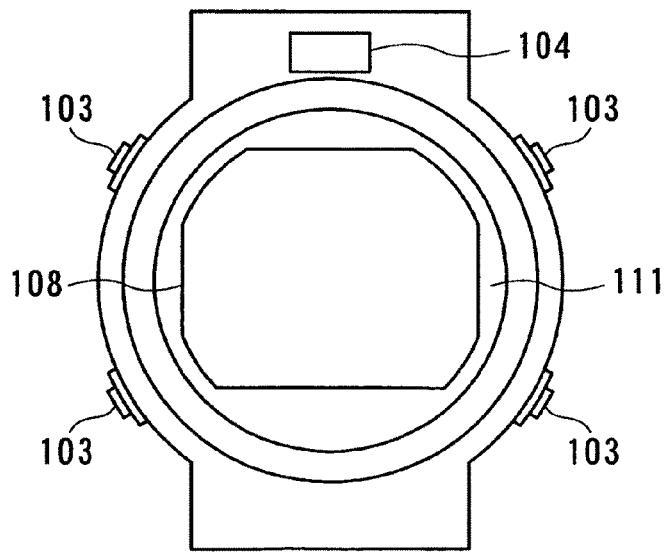
FIG. 9 is a view showing the external appearance of the ultraviolet ray measuring apparatus according to the fifth embodiment of the invention.

Next, the external appearance of the ultraviolet ray measuring apparatus 500 according to the embodiment will be described. FIG. 9 is a view showing the external appearance of the ultraviolet ray measuring apparatus 500 according to the embodiment. In the example shown in the drawing, the ultraviolet ray measuring apparatus 500 is a wristwatch type apparatus. In addition, in the ultraviolet ray measuring apparatus 500, the ultraviolet ray sensor 104 and the solar power generation unit 111 are disposed on the front surface of the ultraviolet ray measuring apparatus 500 so that the ultraviolet ray receiving surface (in a direction in which ultraviolet rays are detected) of the ultraviolet ray sensor 104 and the light receiving surface (in a direction in which light is received) of the solar power generation unit 111 face in the same direction (or in almost the same direction). In addition, in the ultraviolet ray measuring apparatus 500, the display unit 108 is disposed on the front surface of the ultraviolet ray measuring apparatus 500, and the input unit 103 is disposed on a side surface of the ultraviolet ray measuring apparatus 500.

As such, in the ultraviolet ray measuring apparatus 500, the ultraviolet ray sensor 104 and the solar power generation unit 111 are disposed so that the ultraviolet ray receiving surface of the ultraviolet ray sensor 104 and the light receiving surface of the solar power generation unit 111 face in the same direction (or in almost the same direction). In addition, in a case in which the light receiving surface of the solar power generation unit 111 is facing the sun, the voltage generated by the solar power generation unit 111 is increased (the amount of power is increased). As a result, in a case in which the voltage generated by the solar power generation unit 111 is large (the amount of power is large), the ultraviolet ray receiving surface of the ultraviolet ray sensor 104 is facing the sun (in a predetermined direction) and therefore the ultraviolet ray sensor 104 can measure ultraviolet intensity further accurately.

Figure 10:
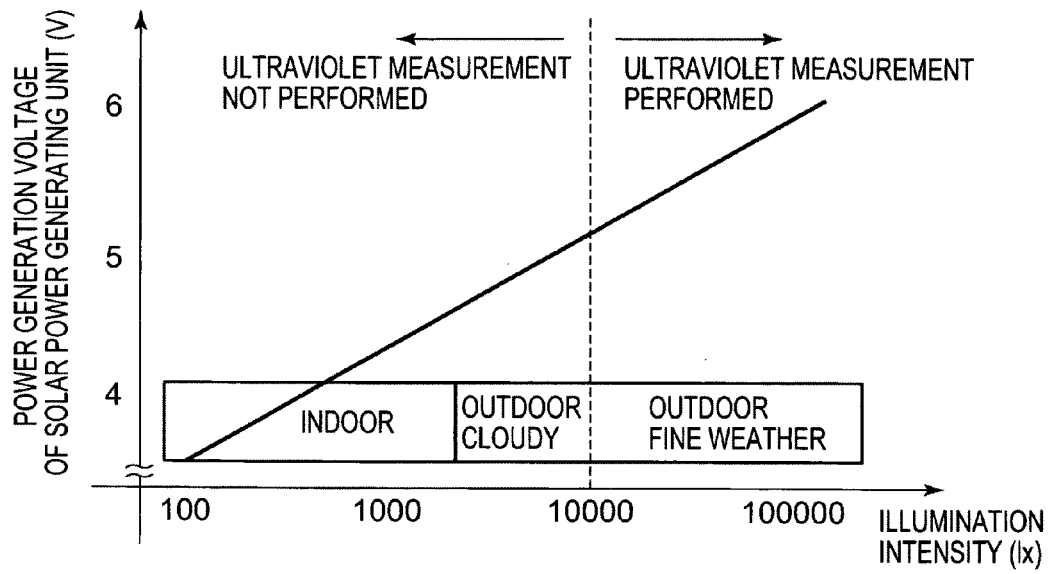
FIG. 10 is a graph showing the relationship between the illumination intensity of light irradiated to the solar power generation unit and the power generation voltage of the solar power generation unit, an indoor illumination intensity, an outdoor illumination intensity in cloudy weather and an outdoor illumination intensity in fine weather in the fifth embodiment of the invention.

Next, the relationship between the power generation voltage of the solar power generation unit 111 and the illumination intensity and the weather will be described. FIG. 10 is a view showing a graph showing the relationship between the illumination intensity of light irradiated to the solar power generation unit 111 and the power generation voltage of the solar power generation unit 111, an indoor illumination intensity, an outdoor illumination intensity in cloudy weather and an outdoor illumination intensity in fine weather in the embodiment.

In the example shown in the drawing, in a case in which the illumination intensity of the light irradiated to the light receiving surface of the solar power generation unit 111 is 100 lux, the power generation voltage of the solar power generation unit 111 is 3 V. In addition, in a case in which the illumination intensity of the light irradiated to the light receiving surface of the solar power generation unit 111 is 10000 lux (1×), the power generation voltage of the solar power generation unit 111 is 5.2 V. In addition, in a case in which the illumination intensity of the light irradiated to the light receiving surface of the solar power generation unit 111 is 100000 lux, the power generation voltage of the solar power generation unit 111 is 6 V. The power generation voltages of the solar power generation unit 111 in cases with other illumination intensities of the light irradiated to the light receiving surface of the solar power generation unit 111 are as shown in the drawing.

In addition, in the example shown in the drawing, the indoor illumination intensity is less than 3000 lux; the outdoor illumination intensity in cloudy weather is from 3000 lux to 10000 lux; the outdoor illumination intensity in fine weather is 10000 lux or higher.

As such, the illumination intensity of light irradiated to the solar power generation unit 111 is associated with the power generation voltage of the solar power generation unit 111, and the range of indoor illumination intensity, the range of outdoor illumination intensity in cloudy weather, and the range of outdoor illumination intensity in fine weather have been fixed to some extent. Therefore, the ultraviolet ray measuring apparatus 500 can determine whether or not the ultraviolet ray measuring apparatus 500 itself locates in a location with a strong illumination intensity of light, that is, a location with a strong ultraviolet intensity from the value of power generation voltage in a case in which the light receiving surface of the solar power generation unit 111 is facing the sun. Here, if the light receiving surface of the solar power generation unit 111 is not facing the sun, even when the ultraviolet ray measuring apparatus 500 is not in a location with a strong ultraviolet intensity, the amount of power generated by the solar power generation unit 111 is reduced.

In the embodiment, the ultraviolet ray measuring apparatus 500 is in a location with an illumination intensity of light of 10000 lux or higher, and the measurement of ultraviolet intensity is performed in a case in which the ultraviolet ray receiving surface of the ultraviolet ray sensor 104 and the light receiving surface of the solar power generation unit 111 are facing the sun. That is, if the power generation voltage of the solar power generation unit 111 is 5.2 V or higher, the ultraviolet ray measuring apparatus 500 determines that the conditions for the start of the measurement of ultraviolet intensity are satisfied and performs the measurement of ultraviolet intensity. Here, the amount of power generated by the solar power generation unit 111 (power generation voltage), which is a reference for determining that the condition for the start of the measurement of ultraviolet intensity by the ultraviolet ray measuring apparatus 500 is satisfied may be determined in advance, may be arbitrarily set according to the power generation capacity or the like of the solar power generation unit 111, or may be arbitrarily set by the user.

Figure 11:
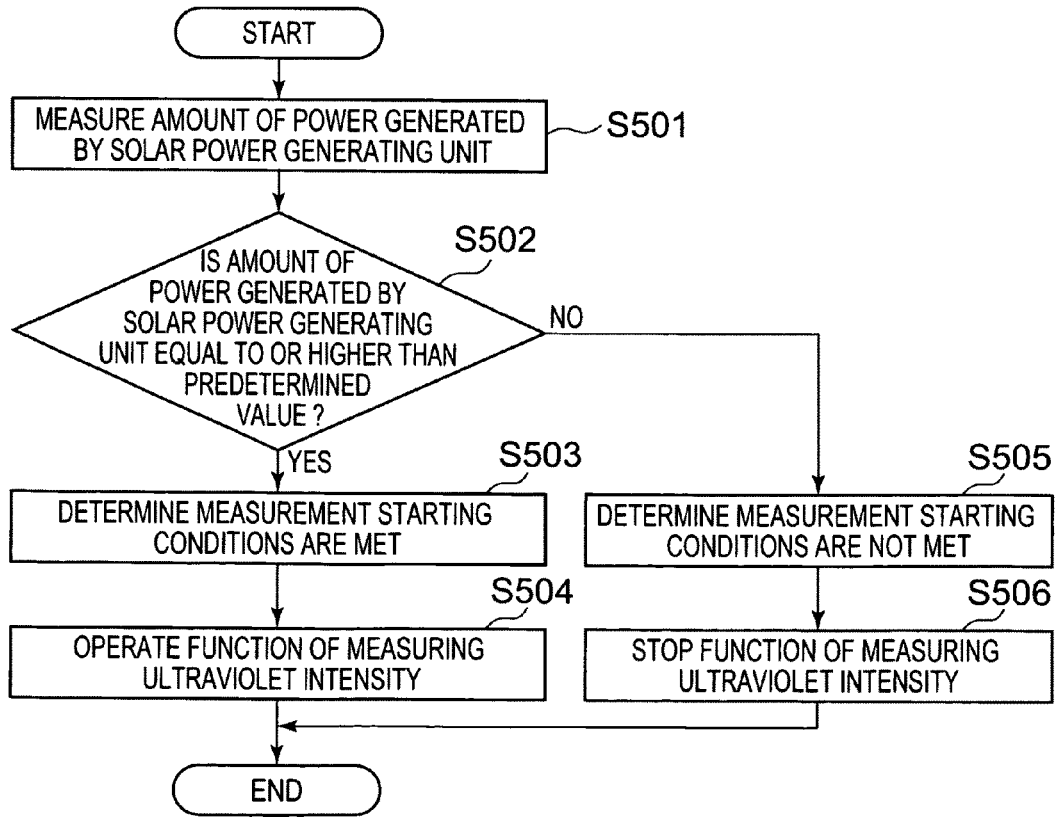
FIG. 11 is a flowchart showing the operations of the ultraviolet ray measuring apparatus according to the fifth embodiment of the invention.

Next, the operations of the ultraviolet ray measuring apparatus 500 according to the embodiment will be described. FIG. 11 is a flowchart showing the operations of the ultraviolet ray measuring apparatus 500 according to the embodiment.

(Step S501) The power generation voltage detecting unit 112 measures the amount of power generated by the solar power generation unit 111 (power generation voltage). After that, the operation proceeds to the process in Step S502. Meanwhile, in the embodiment, the power generation voltage is used as the amount of power generated, but the amount of power generated is not limited thereto. For example, any values may be used as long as they are varied according to the amount of power generated by the solar power generation unit 111, such as power generation current or the like.

(Step S502) The CPU 101 determines whether or not the amount of power generated by the solar power generation unit 111 (power generation voltage) measured by the power generation voltage detecting unit 112 in Step S501 is equal to or higher than a predetermined value (5.2 V or higher). In a case in which the CPU 101 determines that the amount of power generated by the solar power generation unit 111 is equal to or higher than the predetermined value, the operation proceeds to the process in Step S503, and, in other cases, the operation proceeds to the process in Step S505.

(Step S503) The CPU 101 determines that the conditions for the start of the measurement of ultraviolet intensity are satisfied. After that, the operation proceeds to the process in Step S504.

(Step S504) The CPU 101 activates the function of measuring ultraviolet intensity. After that, the operation is finished. In detail, the CPU 101 activates the ultraviolet ray sensor 104, the amplifying unit 105 and the A/D converting unit 106. Thereby, the ultraviolet ray sensor 104 outputs analog signals corresponding to the ultraviolet intensity, and the amplifying unit 105 amplifies the analog signals output by the ultraviolet ray sensor 104, and the A/D converting unit 106 converts the analog signals amplified by the amplifying unit 105 to digital signals.

(Step S505) The CPU 101 determines that the conditions for the start of the measurement of ultraviolet intensity are not satisfied. After that, the operation proceeds to the process in Step S506.

(Step S506) The CPU 101 stops the function of measuring ultraviolet intensity. After that, the operation is finished. In detail, the CPU 101 stops the ultraviolet ray sensor 104, the amplifying unit 105 and the A/D converting unit 106. Thereby, it is possible to suppress power consumed by the ultraviolet ray sensor 104, the amplifying unit 105 and the A/D converting unit 106.

As described above, according to the embodiment, the ultraviolet ray measuring apparatus 500 determines whether or not the ultraviolet ray measuring apparatus 500 itself is in a location with a strong ultraviolet intensity and the ultraviolet ray receiving surface of the ultraviolet ray sensor 104 is facing the sun based on the amount of power generated by the solar power generation unit 111, and, in a case in which the ultraviolet ray measuring apparatus 500 itself is in a location with a weak ultraviolet intensity and the ultraviolet ray receiving surface of the ultraviolet ray sensor 104 is facing the sun, activates the function of measuring ultraviolet intensity, and, in other cases, stops the function of measuring ultraviolet intensity.

Thereby, it is possible to make the ultraviolet ray measuring apparatus 500 automatically perform the measurement of ultraviolet rays without a user's operation for measuring ultraviolet intensity in a case in which the ultraviolet ray measuring apparatus 500 is in a location with a strong ultraviolet intensity and the ultraviolet ray receiving surface of the ultraviolet ray sensor 104 is facing the sun. In addition, since the ultraviolet ray measuring apparatus 500 performs the measurement of ultraviolet rays in a case in which the ultraviolet ray receiving surface of the ultraviolet ray sensor 104 is facing the sun, it is possible to further accurately measure ultraviolet intensity. Furthermore, in a case in which the ultraviolet ray measuring apparatus 500 is in a location with a weak ultraviolet intensity or the ultraviolet ray receiving surface of the ultraviolet ray sensor 104 is not facing the sun, since the ultraviolet ray measuring apparatus 500 automatically stops the measurement of ultraviolet ray, it is possible to reduce power consumption.

Sixth Embodiment

Hereinafter, the sixth embodiment of the invention will be described with reference to the accompanying drawings. The configuration of the ultraviolet ray measuring apparatus 500 of the sixth embodiment is identical to the configuration of the ultraviolet ray measuring apparatus 500 of the fifth embodiment. The difference between the ultraviolet ray measuring apparatus 500 of the sixth embodiment and the ultraviolet ray measuring apparatus 500 of the fifth embodiment is that the ultraviolet ray measuring apparatus 500 of the sixth embodiment obtains the ultraviolet intensity for a fixed period at a fixed interval (sampling) and considers the maximum value as the measured value when performing the measurement of ultraviolet intensity. This is for further reducing power consumption by obtaining the ultraviolet intensity at a fixed time interval, instead of obtaining the ultraviolet intensity at all times, when performing the measurement of ultraviolet intensity. Here, the fixed time period and fixed interval, in which the ultraviolet ray measuring apparatus 500 obtains the ultraviolet intensity, may be specified in advance or may be arbitrarily varied by the user.

Figure 12:
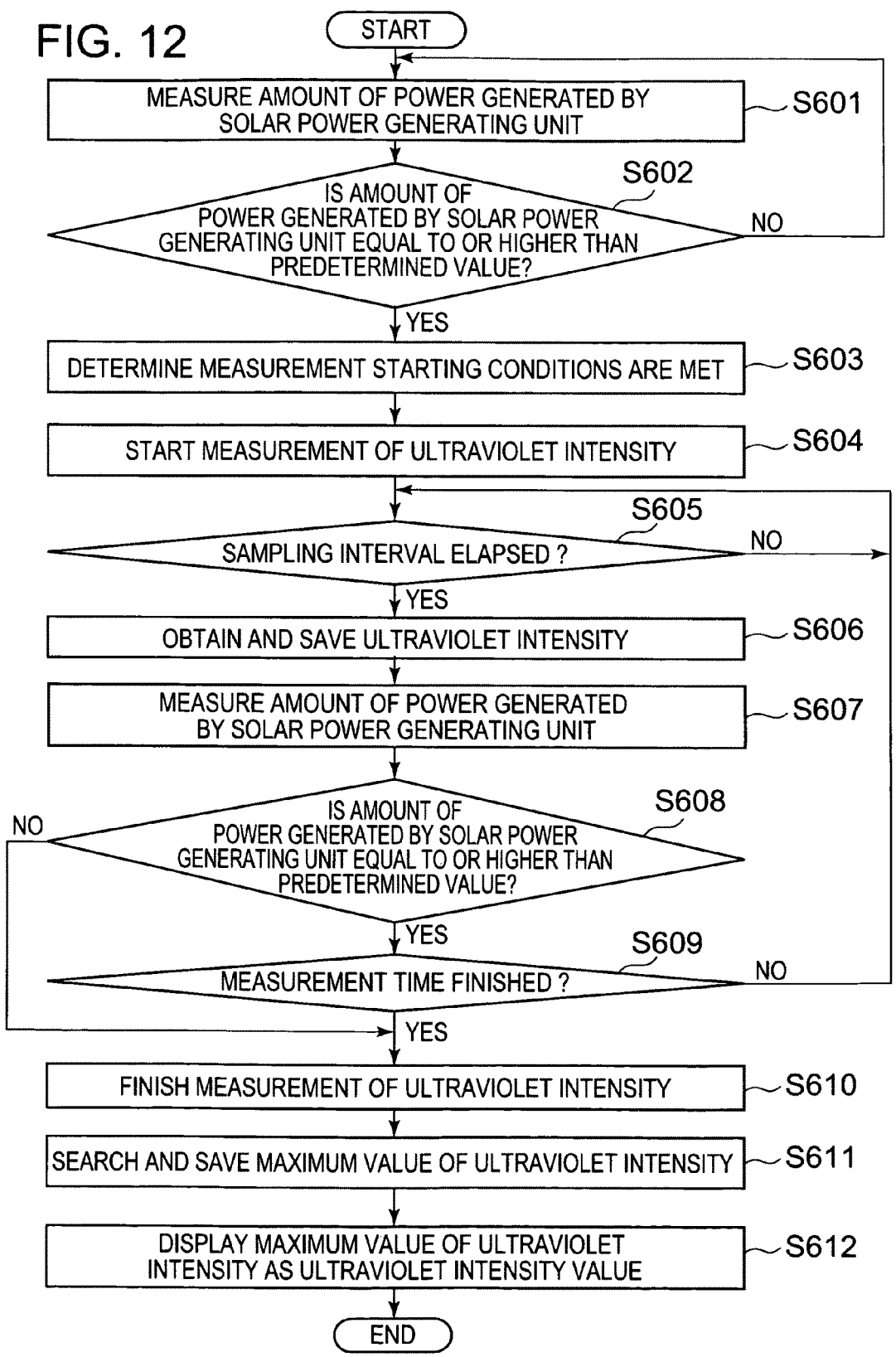
FIG. 12 is a flowchart showing the operations of the ultraviolet ray measuring apparatus according to a sixth embodiment of the invention.

Next, the operations of the ultraviolet ray measuring apparatus 500 according to the sixth embodiment will be described. FIG. 12 is a flowchart showing the operations of the ultraviolet ray measuring apparatus 500 according to the embodiment.

(Step S601) The power generation voltage detecting unit 112 measures the amount of power generated by the solar power generation unit 111. After that, the operation proceeds to the process in Step S602.

(Step S602) The CPU 101 determines whether or not the amount of power generated by the solar power generation unit 111 measured by the power generation voltage detecting unit 112 in Step S601 is equal to or higher than a predetermined value. In a case in which the CPU 101 determines that the amount of power generated by the solar power generation unit 111 is equal to or higher than the predetermined value, the operation proceeds to the process in Step S603, and, in other cases, the operation returns to the process in Step S601.

(Step S603) The CPU 101 determines that the conditions for the start of the measurement of ultraviolet intensity are satisfied. After that, the operation proceeds to the process in Step S604.

(Step S604) The CPU 101 starts the measurement of ultraviolet intensity (the processes in Step S605 to Step S609).

(Step S605) The CPU 101 determines whether or not n seconds (a fixed time interval, for example, 125 ms) has elapsed from the time when the previous ultraviolet intensity was obtained based on the current time output by the clock unit 107 and the time when the previous ultraviolet intensity was obtained, which is stored in the memory unit 109. In a case in which the CPU 101 determines that the current time output by the clock unit 107 is n seconds after the time when the previous ultraviolet intensity was obtained, which is stored in the memory unit 109, the operation proceeds to the process in Step S606, and, in other cases, the process in Step S605 is executed again. Meanwhile, in a case in which the process in Step S605 is performed for the first time, ultraviolet intensity is yet to be obtained, and therefore the operation proceeds to the process in Step S606.

(Step S606) The CPU 101 activates the ultraviolet ray sensor 104, the amplifying unit 105 and the A/D converting unit 106. The ultraviolet ray sensor 104 outputs analog signals corresponding to the ultraviolet intensity. The amplifying unit 105 amplifies the analog signals output by the ultraviolet ray sensor 104. The A/D converting unit 106 converts the analog signals amplified by the amplifying unit 105 to digital signals. The CPU 101 obtains the ultraviolet intensity based on the input digital signals and associates the current time output by the clock unit 107 and the obtained ultraviolet intensity and stores it in the memory unit 109. After that, the operation proceeds to the process in Step S607.

(Step S607) The power generation voltage detecting unit 112 measures the amount of power generated by the solar power generation unit 111. After that, the operation proceeds to the process in Step S608.

(Step S608) The CPU 101 determines whether or not the amount of power generated by the solar power generation unit 111 measured by the power generation voltage detecting unit 112 in Step S607 is equal to or higher than a predetermined value. In a case in which the CPU 101 determines that the amount of power generated by the solar power generation unit 111 is equal to or higher than the predetermined value, the operation proceeds to the process in Step S609, and, in other cases, the operation returns to the process in Step S610.

(Step S609) The CPU 101 determines whether or not m seconds (a fixed time period, for example, 30 seconds) has elapsed from the time when ultraviolet intensity was obtained for the first time based on the current time output by the clock unit 107 and the very first time when the previous ultraviolet intensity was obtained, which is stored in the memory unit 109. In a case in which the CPU 101 determines that the current time output by the clock unit 107 is m seconds after the time when ultraviolet intensity was obtained for the first time, which is stored in the memory unit 109, the operation proceeds to the process in Step S610, and, in other cases, the operation returns to the process in Step S605.

(Step S610) The CPU 101 finishes the measurement of ultraviolet intensity (the processes in Step S605 to Step S609). After that, the operation proceeds to the process in Step S611.

(Step S611) The CPU 101 searches for the maximum value of the ultraviolet intensities obtained in Step S606. After that, the operation proceeds to the process in Step S612.

(Step S612) The CPU 101 displays the maximum value of the ultraviolet intensities searched for in Step S611 as a measured value of ultraviolet intensity on the display unit 108. After that, the operation is finished.

As described above, according to the embodiment, the ultraviolet ray measuring apparatus 500 determines whether or not the ultraviolet ray measuring apparatus 500 itself is in a location with a strong ultraviolet intensity and the ultraviolet ray receiving surface of the ultraviolet ray sensor 104 is facing the sun based on the amount of power generated by the solar power generation unit 111 and measures ultraviolet intensity only in a case in which the ultraviolet ray measuring apparatus 500 itself is in a location with a strong ultraviolet intensity and the ultraviolet ray receiving surface of the ultraviolet ray sensor 104 is facing the sun. In addition, in a case in which the ultraviolet ray measuring apparatus 500 performs the measurement of ultraviolet intensity, ultraviolet intensity is obtained for a fixed period at a fixed interval (sampling), and the maximum value of the obtained ultraviolet intensities is considered as a measured value of ultraviolet intensity. Thereby, the number of times when the ultraviolet ray measuring apparatus 500 obtains the ultraviolet intensity is reduced, and therefore it is possible to reduce power consumption.

Seventh Embodiment

Hereinafter, the seventh embodiment of the invention will be described with reference to the accompanying drawings. The configuration of the ultraviolet ray measuring apparatus 500 of the embodiment is identical to the configuration of the ultraviolet ray measuring apparatus 500 of the sixth embodiment. The difference between the ultraviolet ray measuring apparatus 500 of the seventh embodiment and the ultraviolet ray measuring apparatus 500 of the sixth embodiment is that the ultraviolet ray measuring apparatus 500 of the seventh embodiment starts the next measurement of ultraviolet intensity only in a case in which a fixed time period has elapsed from the previous measurement of ultraviolet intensity. This is for further reducing power consumption by starting the measurement of ultraviolet intensity every fixed time period since ultraviolet intensity is not frequently changed. Here, the time interval (a fixed time period), at which the ultraviolet ray measuring apparatus 500 starts the measurement of ultraviolet intensity, may be specified in advance or may be arbitrarily varied by the user.

Figure 13:
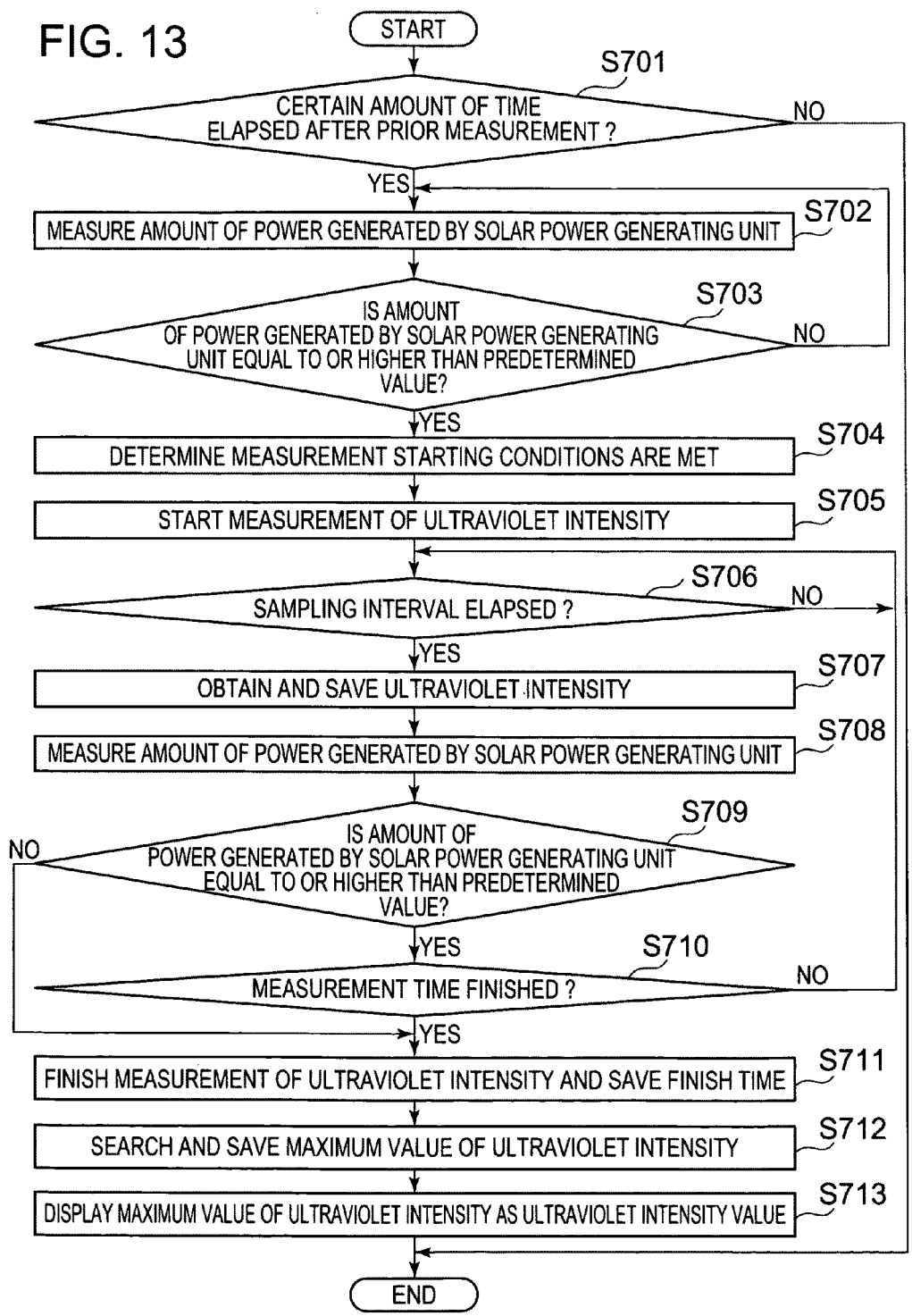
FIG. 13 is a flowchart showing the operations of the ultraviolet ray measuring apparatus according to a seventh embodiment of the invention.

Next, the operations of the ultraviolet ray measuring apparatus 500 according to the seventh embodiment will be described. FIG. 13 is a flowchart showing the operations of the ultraviolet ray measuring apparatus 500 according to the embodiment.

(Step S701) The CPU 101 determines whether or not the current time output by the clock unit 107 is x minutes (a fixed time period, for example, 30 minutes) after the time when the previous measurement of ultraviolet intensity was finished, which is stored in the memory unit 109. In a case in which the CPU 101 determines that the current time output by the clock unit 107 is x minutes after the time when the previous measurement of ultraviolet intensity was finished, which is stored in the memory unit 109, the operation proceeds to the process in Step S702, and, in other cases, the operation is finished. Meanwhile, in a case in which no measurement of ultraviolet intensity has been performed, the operation proceeds to the process in Step S702.

The processes in Step S702 to Step S710 are identical to the processes in Step S601 to Step S609 in the sixth embodiment.

(Step S711) The CPU 101 finishes the measurement of ultraviolet intensity (the processes in Step S706 to Step S710) and stores the current time output by the clock unit 107 as the time when the measurement of ultraviolet intensity is finished in the memory unit 109. After that, the operation proceeds to the process in Step S712.

(Step S712) The CPU 101 searches for the maximum value of the ultraviolet intensities obtained in Step S707. After that, the operation proceeds to the process in Step S713.

(Step S713) The CPU 101 displays the maximum value of the ultraviolet intensities searched for in Step S712 as a measured value of ultraviolet intensity on the display unit 108. After that, the operation is finished.

As described above, according to the embodiment, the ultraviolet ray measuring apparatus 500 determines whether or not the ultraviolet ray measuring apparatus 500 itself is in a location with a strong ultraviolet intensity and the ultraviolet ray receiving surface of the ultraviolet ray sensor 104 is facing the sun based on the amount of power generated by the solar power generation unit 111, and measures the ultraviolet intensity only in a case in which the ultraviolet ray receiving surface of the ultraviolet ray sensor 104 is facing the sun. In addition, the ultraviolet ray measuring apparatus 500 obtains the ultraviolet intensity for a fixed period at a fixed interval (sampling) and considers the maximum value of the obtained ultraviolet intensities as a measured value of ultraviolet intensity when performing the measurement of ultraviolet intensity. In addition, the ultraviolet ray measuring apparatus 500 starts the next measurement of ultraviolet intensity only in a case in which a fixed time period has elapsed from the previous measurement of ultraviolet intensity. Thereby, the number of times when the ultraviolet ray measuring apparatus 500 measures the ultraviolet intensity is reduced, and therefore it is possible to further reduce power consumption.

Eighth Embodiment

Hereinafter, the eighth embodiment of the invention will be described with reference to the accompanying drawings. The configuration of the ultraviolet ray measuring apparatus 500 of the embodiment is identical to the configuration of the ultraviolet ray measuring apparatus 500 of the seventh embodiment. The difference between the ultraviolet ray measuring apparatus 500 of the eighth embodiment and the ultraviolet ray measuring apparatus 500 of the seventh embodiment is that the ultraviolet ray measuring apparatus 500 of the eighth embodiment starts the next measurement of ultraviolet intensity when the previously measured ultraviolet intensity is below a reference value and a reference amount of time has elapsed from the previous measurement of ultraviolet intensity even in a case in which a fixed time period has not elapsed from the previous measurement of ultraviolet intensity.

This is because, in a case in which ultraviolet rays are measured when ultraviolet intensity is weak, such as when the sun is hidden behind a cloud unexpectedly or the like, the ultraviolet intensity significantly differs from the ultraviolet intensity when ultraviolet intensity is strong, such as when the sun is not hidden behind a cloud or the like. Therefore, in a case in which the previously measured ultraviolet intensity is below the reference value, by shortening the amount of time (a reference amount of time) until the ultraviolet intensity is measured again, it is possible to perform the measurement of ultraviolet intensity without damaging a user's sense of usefulness. Here, in a case in which the previously measured ultraviolet intensity is below the reference value, the amount of time (the reference amount of time) until the ultraviolet ray measuring apparatus 500 measures the ultraviolet intensity again may be specified in advance or may be arbitrarily varied by the user.

Figure 14:
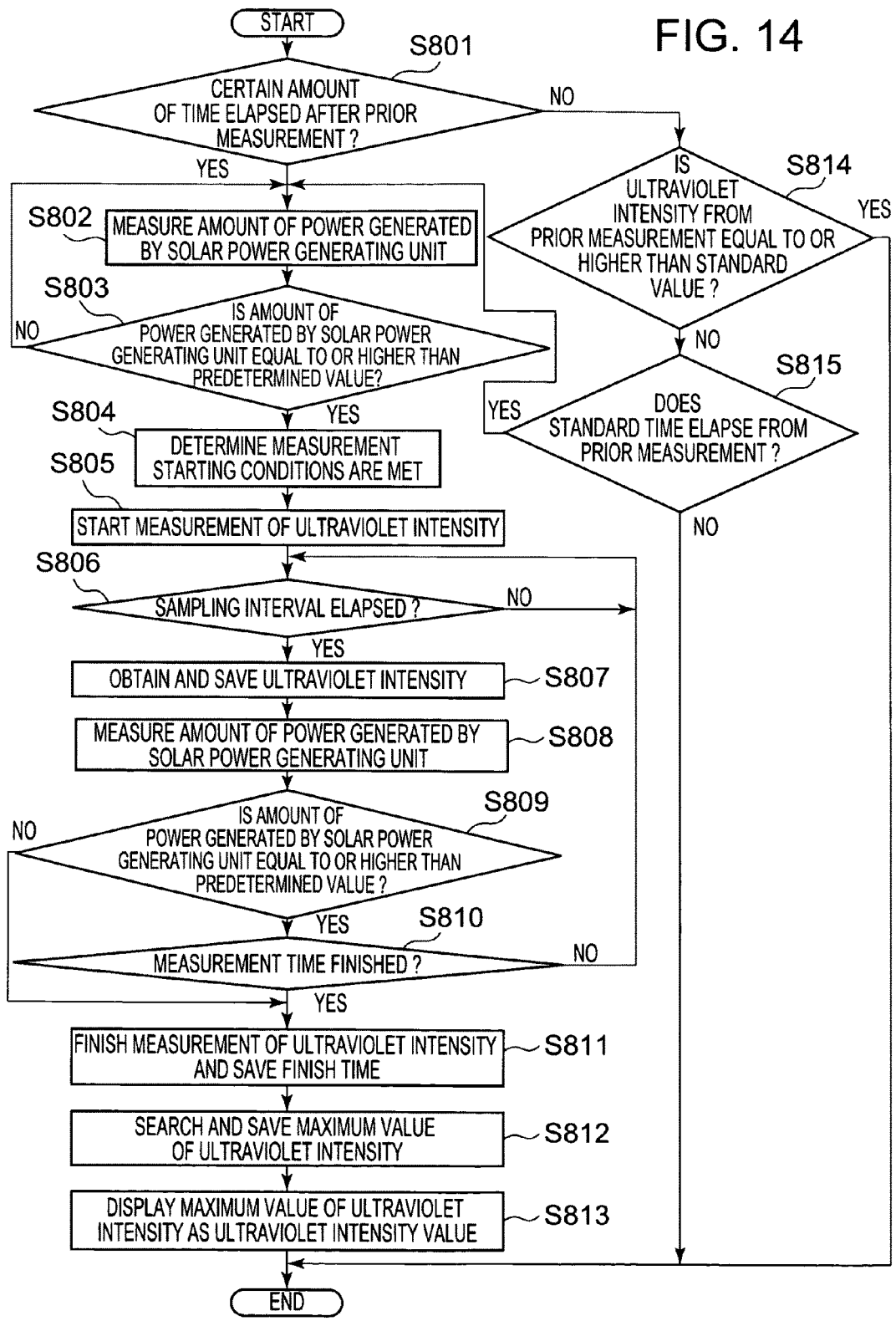
FIG. 14 is a flowchart showing the operations of the ultraviolet ray measuring apparatus according to an eighth embodiment of the invention.

Next, the operations of the ultraviolet ray measuring apparatus 500 according to the eighth embodiment will be described. FIG. 14 is a flowchart showing the operations of the ultraviolet ray measuring apparatus 500 according to the embodiment.

(Step S801) The CPU 101 determines whether or not the current time output by the clock unit 107 is x minutes (a fixed time period, for example, 30 minutes) after the time when the previous measurement of ultraviolet intensity was finished, which is stored in the memory unit 109. In a case in which the CPU 101 determines that the current time output by the clock unit 107 is x minutes after the time when the previous measurement of ultraviolet intensity was finished, which is stored in the memory unit 109, the operation proceeds to the process in Step S802, and, in other cases, the operation proceeds to the process in Step S814. Meanwhile, in a case in which no measurement of ultraviolet intensity has been performed, the operation proceeds to the process in Step S802.

The processes in Step S802 to Step S811 are identical to the processes in Step S702 to Step S711 in the seventh embodiment.

(Step S812) The CPU 101 searches for the maximum value of the ultraviolet intensities obtained in Step S807. Subsequently, the CPU 101 associates the maximum value of ultraviolet intensity searched for to the time when the measurement of ultraviolet intensity was finished, which was stored in the memory unit 109 in Step S811, and stores it in the memory unit 109. After that, the operation proceeds to the process in Step S813.

(Step S813) The CPU 101 displays the maximum value of the ultraviolet intensities searched for in Step S812 as a measured value of ultraviolet intensity on the display unit 108. After that, the operation is finished.

(Step S814) The CPU 101 determines whether or not the ultraviolet intensity of when the previous ultraviolet intensity stored in the memory unit 109 was measured is equal to or higher than the reference value. In a case the CPU 101 determined that the ultraviolet intensity of when the previous ultraviolet intensity was measured is equal to or higher than the reference value, the operation is finished, and, in other cases, the operation proceeds to the process in Step S815.

(Step S815) The CPU 101 determines whether or not the current time output by the clock unit 107 is y minutes (the reference amount of time, for example, 10 minutes) after the time when the previous measurement of ultraviolet intensity was finished, which is stored in the memory unit 109. In a case in which the CPU 101 determines that the current time output by the clock unit 107 is y minutes after the time when the previous measurement of ultraviolet intensity was finished, which is stored in the memory unit 109, the operation returns to the process in Step S802, and, in other cases, the operation is finished.

As described above, according to the embodiment, the ultraviolet ray measuring apparatus 500 determines whether or not the ultraviolet ray measuring apparatus 500 itself is in a location with a strong ultraviolet intensity and the ultraviolet ray receiving surface of the ultraviolet ray sensor 104 is facing the sun based on the amount of power generated by the solar power generation unit 111, and measures the ultraviolet intensity only in a case in which the ultraviolet ray measuring apparatus 500 itself is in a location with a strong ultraviolet intensity and the ultraviolet ray receiving surface of the ultraviolet ray sensor 104 is facing the sun. In addition, in a case in which the ultraviolet ray measuring apparatus 500 performs the measurement of ultraviolet intensity, ultraviolet intensity is obtained for a fixed period at a fixed interval (sampling), and the maximum value of the obtained ultraviolet intensities is considered as a measured value of ultraviolet intensity. In addition, the ultraviolet ray measuring apparatus 500 starts the next measurement of ultraviolet intensity when the previously measured ultraviolet intensity is below the reference value and the reference amount of time has elapsed from the previous measurement of ultraviolet intensity even in a case in which a fixed time period has not elapsed from the previous measurement of ultraviolet intensity. Thereby, it is possible to perform the measurement of ultraviolet intensity without damaging a user's sense of usefulness.

Ninth Embodiment

Hereinafter, the ninth embodiment of the invention will be described with reference to the accompanying drawings. The configuration of the ultraviolet ray measuring apparatus 500 of the ninth embodiment is identical to the configuration of the ultraviolet ray measuring apparatus 500 of the seventh embodiment. The difference between the ultraviolet ray measuring apparatus 500 of the ninth embodiment and the ultraviolet ray measuring apparatus 500 of the seventh embodiment is that the ultraviolet ray measuring apparatus 500 of the ninth embodiment starts the next measurement of ultraviolet intensity when the amount of power generated by the solar power generation unit 111 is increased by a fixed amount or more from the amount of power generated by the solar power generation unit 111 when measuring the previous ultraviolet intensity even in a case in which a fixed time period has not elapsed from the previous measurement of ultraviolet intensity.

This is, since the amount of ultraviolet rays is also increased in a case in which the intensity of the sun light is strengthened, for making it possible to perform the measurement of ultraviolet intensity without damaging a user's sense of usefulness by measuring ultraviolet intensity again in a case in which the intensity of the sun light is strengthened and thus the amount of power generated by the solar power generation unit 111 is increased. Here, the increase in the amount of power generated (a certain amount) that determines whether or not the ultraviolet ray measuring apparatus 500 starts the measurement of ultraviolet intensity may be specified in advance or may be arbitrarily varied by the user.

Figure 15:
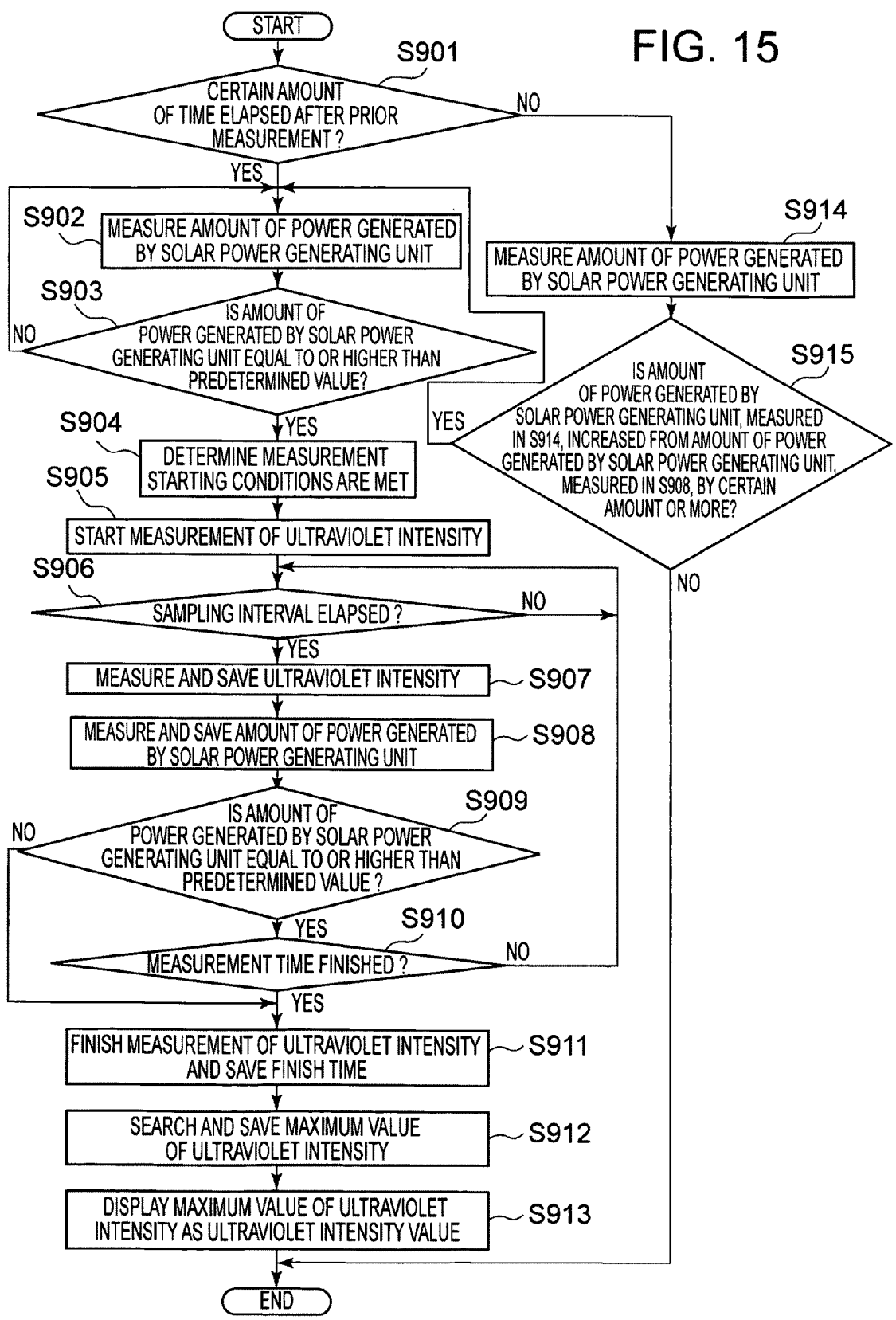
FIG. 15 is a flowchart showing the operations of the ultraviolet ray measuring apparatus according to a ninth embodiment of the invention.

Next, the operations of the ultraviolet ray measuring apparatus 500 according to the ninth embodiment will be described. FIG. 15 is a flowchart showing the operations of the ultraviolet ray measuring apparatus 500 according to the embodiment.

(Step S901) The CPU 101 determines whether or not the current time output by the clock unit 107 is x minutes (a fixed time period, for example, 30 minutes) after the time when the previous measurement of ultraviolet intensity was finished, which is stored in the memory unit 109. In a case in which the CPU 101 determines that the current time output by the clock unit 107 is x minutes after the time when the previous measurement of ultraviolet intensity was finished, which is stored in the memory unit 109, the operation proceeds to the process in Step S902, and, in other cases, the operation proceeds to the process in Step S914. Meanwhile, in a case in which no measurement of ultraviolet intensity has been performed, the operation proceeds to the process in Step S902.

The processes in Step S902 to Step S907 are identical to the processes in Step S702 to Step S707 in the seventh embodiment.

(Step S908) The power generation voltage detecting unit 112 measures the amount of power generated by the solar power generation unit 111. The CPU 101 stores the amount of power generated measured by the generated power amount detecting unit 102 in the memory unit 109. After that, the operation proceeds to the process in Step S909.

The processes in Step S909 to Step S913 are identical to the processes in Step S709 to Step S713 in the seventh embodiment.

(Step S914) The power generation voltage detecting unit 112 measures the amount of power generated by the solar power generation unit 111. After that, the operation proceeds to the process in Step S915.

(Step S915) The CPU 101 determines whether or not the amount of power generated by the solar power generation unit 111, which has been measured by the generated power amount detecting unit 102 in Step S914, is increased by a fixed amount or more (for example, 1 V or more of power generation voltage) from the amount of power generated by the solar power generation unit 111 measured by the generated power amount detecting unit 102 in the previous Step S908, which is stored in the memory unit 109. In a case in which the CPU 101 determines that the amount of power generated by the solar power generation unit 111, which has been measured by the generated power amount detecting unit 102 in Step S914, is increased by a fixed amount or more from the amount of power generated by the solar power generation unit 111 measured by the generated power amount detecting unit 102 in the previous Step S908, which is stored in the memory unit 109, the operation proceeds to the process in Step S902, and, in other cases, the operation is finished.

As described above, according to the embodiment, the ultraviolet ray measuring apparatus 500 determines whether or not the ultraviolet ray measuring apparatus 500 itself is in a location with a strong ultraviolet intensity and the ultraviolet ray receiving surface of the ultraviolet ray sensor 104 is facing the sun based on the amount of power generated by the solar power generation unit 111, and measures the ultraviolet intensity only in a case in which the ultraviolet ray receiving surface of the ultraviolet ray sensor 104 is facing the sun. In addition, in a case in which the ultraviolet ray measuring apparatus 500 performs the measurement of ultraviolet intensity, ultraviolet intensity is obtained for a fixed period at a fixed interval (sampling), and the maximum value of the obtained ultraviolet intensities is considered as a measured value of ultraviolet intensity. In addition, the ultraviolet ray measuring apparatus 500 of the embodiment starts the next measurement of ultraviolet intensity when the amount of power generated is increased by a fixed amount or more from the amount of power generated by the solar power generation unit 111 when measuring the previous ultraviolet intensity even in a case in which a fixed time period has not elapsed from the previous measurement of ultraviolet intensity. Thereby, it is possible to perform the measurement of ultraviolet intensity without damaging a user's sense of usefulness.

Meanwhile, all or part of the functions by each component included in the ultraviolet ray measuring apparatus 500 in the fifth to ninth embodiments may be realized by programs for realizing such functions in a computer-readable recording medium, and reading and executing the program recorded in the recording medium via a computer system. Here, the "computer system" includes hardware, such as an operating system, a peripheral device or the like.

In addition, the "computer-readable recording medium" refers to a transportable medium, such as a flexible disc, a magneto-optical disc, a ROM, a CD-ROM or the like, and a storage unit embedded in a computer system, such as a hard disk or the like. Furthermore, the "computer-readable recording medium" may also include an object that dynamically holds a program for a short amount of time, such as communication wires when transmitting the program via a network circuit, such as the Internet or the like, or a communication line, such as a telephone line or the like, or an object that holds a program at a certain point in time, such as a volatile memory inside a computer, which becomes a server or a client in such a case. In addition, the program may be an object for realizing a part of the above functions or may by an object that can realize the above functions by combining with a program already recorded in a computer.

Thus far, the fifth to ninth embodiments of the invention have been described, but the invention is not limited the embodiments, and a variety of modifications can be added within the scope of the invention. For example, the ultraviolet ray measuring apparatus 500 may be, instead of a wristwatch type apparatus, a small size apparatus which can be easily carried. In addition, the ultraviolet ray measuring apparatus 500 may be incorporated into other electronic devices, such as a pedometer or the like.

Tenth Embodiment

Figure 16:
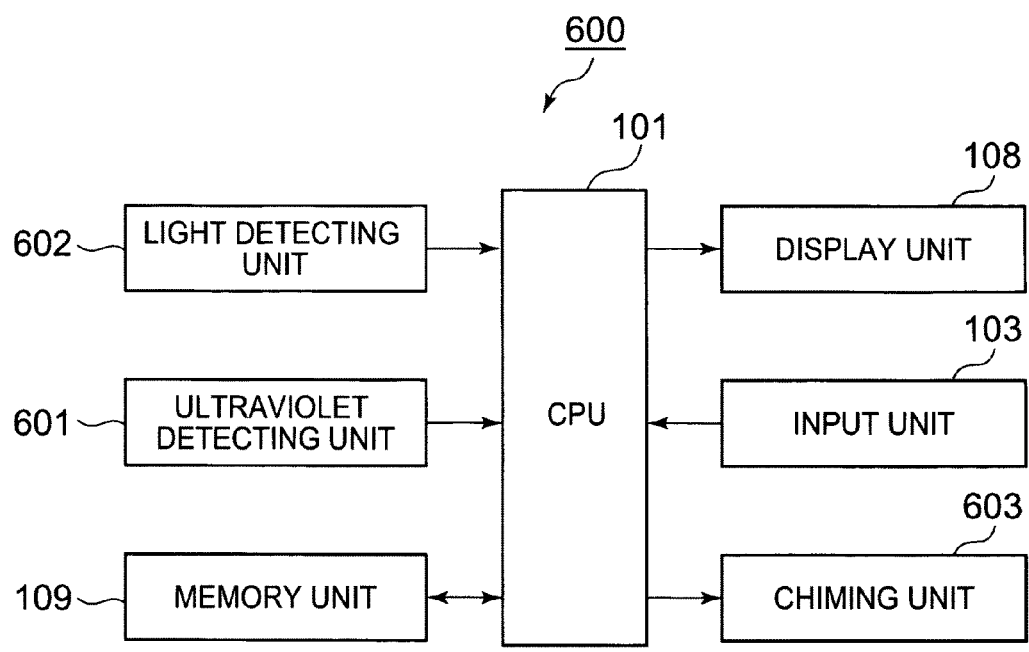
FIG. 16 is a block diagram showing the configuration of an ultraviolet ray measuring apparatus according to a tenth embodiment of the invention.

Hereinafter, the tenth embodiment of the invention will be described with reference to the accompanying drawings. FIG. 16 is a block diagram showing the configuration of an ultraviolet ray measuring apparatus according to the embodiment. In the example shown in the drawing, an ultraviolet ray measuring apparatus 600 includes the CPU 101 (Central Processing Unit, a control unit), the input unit 103, an ultraviolet ray detecting unit 601, a light detecting unit 602, the display unit 108, the memory unit 109 and a notification sound unit 603.

The CPU 101 performs the control of each of the units included in the ultraviolet ray measuring apparatus 600. The input unit 103 is configured with externally operable switches and receives input. The ultraviolet ray detecting unit 601 includes an ultraviolet ray receiving surface that receives ultraviolet rays and output signals corresponding to the received (irradiated) ultraviolet intensity. The display unit 108 displays information showing the intensity of ultraviolet rays detected by the ultraviolet ray detecting unit 601 (measured values ($\mu W/cm^2$), UV index or the like), the date and time or the like.

The memory unit 109 refers to a Read Only Memory (ROM), a Random Access Memory (RAM) or the like, and stores programs executed by the CPU 101, data used by the ultraviolet ray measuring apparatus 600 or the like. The notification sound unit 603 refers to a speaker or the like, and outputs sound.

Figure 17:
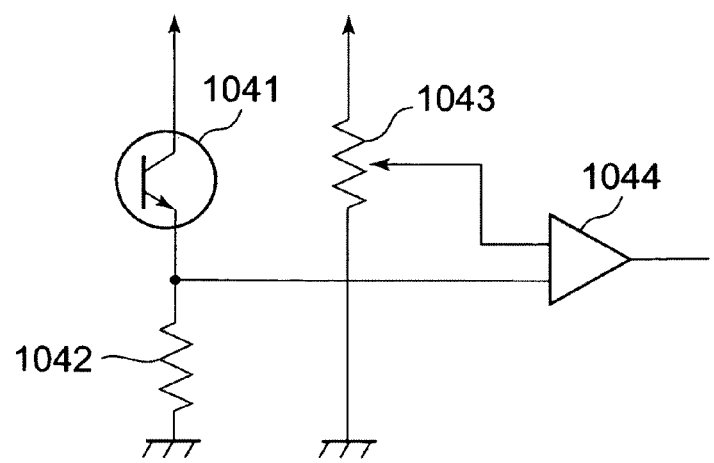
FIG. 17 is a circuit diagram showing the circuit configuration of the light detecting unit in the tenth embodiment of the invention.

Next, the configuration of the light detecting unit 602 according to the embodiment will be described. FIG. 17 is a circuit diagram showing the circuit configuration of the light detecting unit 602 in the embodiment. In the example shown in the drawing, the light detecting unit 602 includes a phototransistor 1041, a resistance 1042, a variable resistance 1043 and a comparator 1044, and detects micro-current generated according to incident light as voltage signals.

Figure 18:
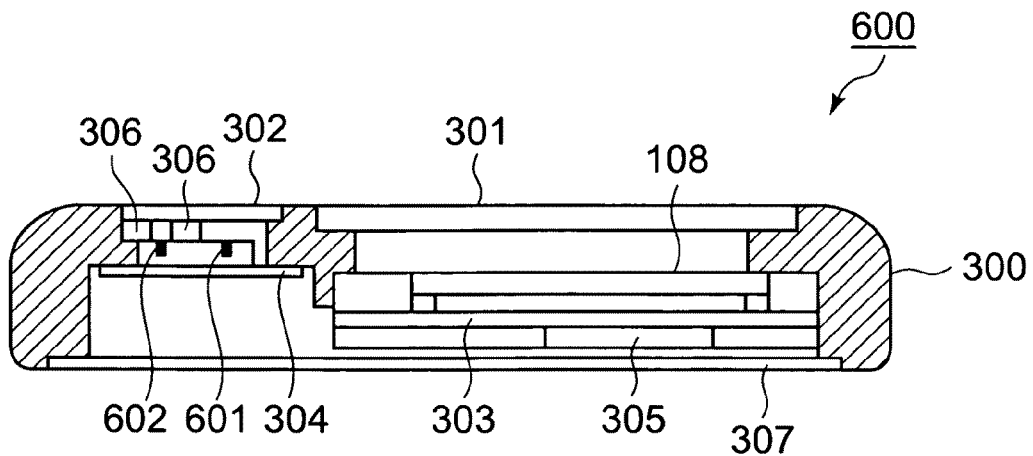
FIG. 18 is a cross-sectional view of the ultraviolet ray measuring apparatus according to the tenth embodiment of the invention.

Next, the disposition of the ultraviolet ray detecting unit 601 and the light detecting unit 602, both of which are included in the ultraviolet ray measuring apparatus 600 according to the embodiment, will be described. FIG. 18 is a cross-sectional view of the ultraviolet ray measuring apparatus 600 according to the embodiment. In the example shown in the drawing, the main body 300 of the ultraviolet ray measuring apparatus 600 is provided with the ultraviolet ray detecting unit 601, the light detecting unit 602, the display unit 108, two pieces of light (the sun light or ultraviolet)-permeable cover glasses 301 and 302, substrates 303 and 304, a battery 305, a member 306 which is made of a light (the sun light or ultraviolet)-impermeable material and includes a fine cylindrical light passage (slit), and a back cover 307.

In the ultraviolet ray measuring apparatus 600, the ultraviolet ray detecting unit 601 and the light detecting unit 602 are disposed so that the ultraviolet ray receiving surface of the ultraviolet ray detecting unit 601 and the light receiving surface of the light detecting unit 602 face in the same direction (or in almost the same direction). In addition, the member 306 is disposed above the light receiving surface of the light detecting unit 602 so that light from the sun (the light source) is irradiated to the light receiving surface without being blocked only in a case in which the light receiving surface of the light detecting unit 602 faces the sun (a light source) (only in a case in which the sunlight is present on the front surface of the light receiving surface).

With this configuration, the light detecting unit 602 detects high intensity light only in a case in which the light receiving surface faces the sun (a light source). In addition, in a case in which the light detecting unit 602 detects high intensity light, the ultraviolet ray receiving surface of the ultraviolet ray detecting unit 601, which is facing in the same direction (or in almost the same direction) as the light receiving surface of the light detecting unit 602, is also facing the light source (the sun) (in a predetermined direction). Thereby, the CPU 101 in the ultraviolet ray measuring apparatus 600 can determine whether or not the ultraviolet ray receiving surface of the ultraviolet ray detecting unit 601 is also facing the sun (the light source) (the sunlight is present on the front surface of the light receiving surface) based on the detection result of light intensity by the light detecting unit 602 (the output voltage of the light detecting unit 602).

Figure 19:
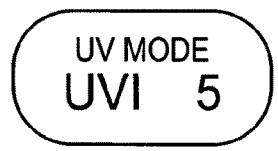
FIG. 19 is a schematic view showing an example of the screen when a measured amount of ultraviolet rays is displayed on the display unit using an UV index in the tenth embodiment of the invention.

Next, the examples of the display screen in the display unit 108 according to the embodiment will be described with reference to FIGS. 19 to 21. FIG. 19 is a schematic view showing an example of the screen when the ultraviolet ray measuring apparatus 600 according to the embodiment displays a measured amount of ultraviolet rays on the display unit 108 using an UV index in the embodiment. In the example shown in the drawing, a title "UV MODE" is displayed on the upper part of the screen, and the UV index "UVI5" is displayed on the lower part of the screen. This shows that the amount of ultraviolet rays measured by the ultraviolet ray measuring apparatus 600 is an UV index of "5."

Figure 20:
FIG. 20 is a schematic view showing an example of the screen when a measured amount of ultraviolet rays is displayed in three steps on the display unit in the tenth embodiment of the invention.

FIG. 20 is a schematic view showing an example of the screen when the ultraviolet ray measuring apparatus 600 in the embodiment displays a measured amount of ultraviolet rays on the display unit 108 in three steps (H (high), M (middle), L (low)). In the example shown in the drawing, "UV H M L" is displayed on the upper part of the screen, and the "H" shows an inverted color. This shows that the amount of ultraviolet rays measured by the ultraviolet ray measuring apparatus 600 is high (which is H). In addition, the lower part of the screen displays the current time.

Figure 21:
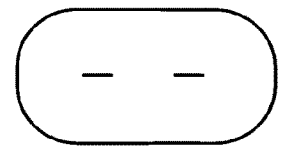
FIG. 21 is a schematic view showing an example of the screen displayed on the display unit in a case in which the amount of ultraviolet rays is not measured in the tenth embodiment of the invention.

FIG. 21 is a schematic view showing an example of the screen displayed on the display unit 108 in a case in which the ultraviolet ray measuring apparatus 600 in the embodiment does not measure the amount of ultraviolet ray.

In the example shown in the drawing, "- -" is displayed in the middle of the screen. This shows that the ultraviolet ray measuring apparatus 600 has not measured the amount of ultraviolet rays.

Figure 22:
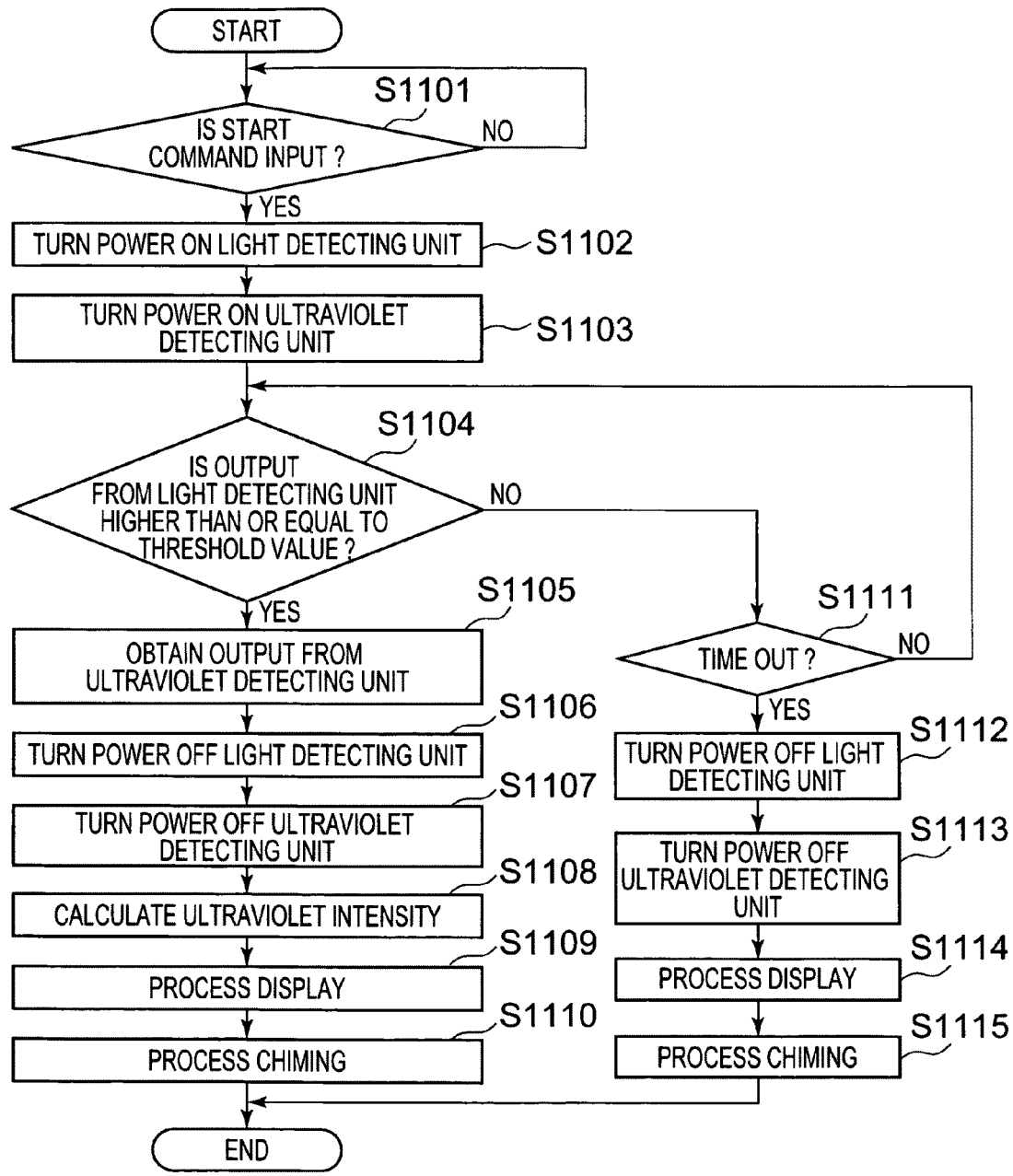
FIG. 22 is a flowchart showing the operations of the ultraviolet ray measuring apparatus according to the tenth embodiment of the invention.

Next, the operations of the ultraviolet ray measuring apparatus 600 according to the embodiment will be described. FIG. 22 is a flowchart showing the operations of the ultraviolet ray measuring apparatus 600 according to the embodiment.

(Step S1101) When performing the measurement of the amount of ultraviolet rays, the user operates the input unit 103 in the ultraviolet ray measuring apparatus 600 to input a command that starts the measurement of the amount of ultraviolet rays. The CPU 101 determines whether or not a command that starts the measurement of the amount of ultraviolet rays is input to the input unit 103. In a case in which the CPU 101 determines that a command that starts the measurement of the amount of ultraviolet rays is input to the input unit 103, the operation proceeds to the process in Step S1102, and, in other cases, the process in Step S1101 is executed again.

(Step S1102) The CPU 101 supplies power to the light detecting unit 602 (turns the power of the light detecting unit 6020N). After that, the operation proceeds to the process in Step S1103. Here, while power is supplied, the light detecting unit 602 outputs voltage corresponding to the intensity of light incident on the light receiving surface.

(Step S1103) The CPU 101 supplies power to the ultraviolet ray detecting unit 601 (turns the power of the ultraviolet ray detecting unit 601 ON). After that, the operation proceeds to the process in Step S1104. Here, while power is supplied, the ultraviolet ray detecting unit 601 outputs voltage corresponding to the intensity of ultraviolet rays incident on the ultraviolet ray receiving surface.

(Step S1104) The CPU 101 determines whether or not the voltage output by the light detecting unit 602 is the predetermined threshold value or higher. The predetermined threshold value is a value which is lower than the voltage output by the light detecting unit 602 when direct sunlight hits the light receiving surface of the light detecting unit 602 head-on, but is higher than the voltage output by the light detecting unit 602 when direct sunlight does not hit the light receiving surface of the light detecting unit 602 head-on, it is little cloudy, or the like. In a case in which the CPU 101 determines that the voltage output by the light detecting unit 602 is the predetermined threshold value or higher, the operation proceeds to the process in Step S1105, and, in other cases, the operation proceeds to the process in Step S1111. Here, the predetermined threshold value may be any value as long as the values can be used to determine that direct sunlight hits head-on the light receiving surface of the light detecting unit 602 or may be arbitrarily varied by the user.

(Step S1105) The CPU 101 obtains voltage corresponding to the intensity of ultraviolet output by the ultraviolet ray detecting unit 601. After that, the operation proceeds to the process in Step S1106.

(Step S1106) The CPU 101 stops the power being supplied to the light detecting unit 602 (turns the power of the light detecting unit 602 OFF). After that, the operation proceeds to the process in Step S1107.

(Step S1107) The CPU 101 stops the power being supplied to the ultraviolet ray detecting unit 601 (turns the power of the ultraviolet ray detecting unit 601 OFF). After that, the operation proceeds to the process in Step S1108.

(Step S1108) The CPU 101 calculates ultraviolet intensity based on the voltage corresponding to the intensity of ultraviolet rays output by the ultraviolet ray detecting unit 601, which was obtained in the process in Step S1105. After that, the operation proceeds to the process in Step S1109. Here, a method, such as a calculating method of ultraviolet intensity, or the like, may be used.

(Step S1109) The CPU 101 displays the ultraviolet intensity calculated in the process in Step S1108 on the display unit 108. After that, the operation proceeds to the process in Step S110. For example, the example of the screen shown in FIG. 19 or FIG. 20 is an example of the screen displayed on the display unit 108 at this time.

(Step S1110) The CPU 101 outputs notification sound, which notifies the user that the measurement of ultraviolet intensity is normally finished, to the notification sound unit 603. After that, the operation is finished.

(Step S1111) The CPU 101 determines whether or not a fixed time period (for example, 30 seconds) has elapsed from the start of the process in Step S1101 (whether or not the time is over). In a case in which the CPU 101 determines that a fixed time period has elapsed from the start of the process in Step S1101 (time is over), the operation proceeds to the process in Step S1112, and, in other cases, the operation returns to the process in Step S1104. Here, the fixed time period (an amount of time until time is over) may be determined in advance or may be arbitrarily varied by the user.

(Step S1112) The CPU 101 stops the power being supplied to the light detecting unit 602 (turns the power of the light detecting unit 602 OFF). After that, the operation proceeds to the process in Step S1113.

(Step S1113) The CPU 101 stops the power being supplied to the ultraviolet ray detecting unit 601 (turns the power of the ultraviolet ray detecting unit 601 OFF). After that, the operation proceeds to the process in Step S1114.

(Step S1114) The CPU 101 displays that ultraviolet intensity has not been measured, on the display unit 108. After that, the operation proceeds to the process in Step S150. For example, the example of the screen shown in FIG. 21 is an example of the screen displayed on the display unit 108 at this time.

(Step S1115) The CPU 101 outputs notification sound, which notifies the user that ultraviolet intensity has not been measured, to the notification sound unit 603. After that, the operation is finished.

As described above, according to the embodiment, in the ultraviolet ray measuring apparatus 600, the ultraviolet ray detecting unit 601 and the light detecting unit 602 are disposed so that the ultraviolet ray receiving surface of the ultraviolet ray detecting unit 601 and the light receiving surface of the light detecting unit 602 face in the same direction (or in almost the same direction). In addition, the member 306 is disposed above the light receiving surface of the light detecting unit 602 so that light from the sun (the light source) is irradiated to the light receiving surface without being blocked only in a case in which the light receiving surface of the light detecting unit 602 faces the sun (a light source) (only in a case in which the sunlight is present on the front surface of the light receiving surface).

With this configuration, the light detecting unit 602 detects high intensity light only in a case in which the light receiving surface faces the sun (a light source). In addition, in a case in which the light detecting unit 602 detects high intensity light, the ultraviolet ray receiving surface of the ultraviolet ray detecting unit 601, which is facing in the same direction (or in almost the same direction) as the light receiving surface of the light detecting unit 602, is also facing the light source (the sun). Thereby, the CPU 101 in the ultraviolet ray measuring apparatus 600 can determine whether or not the ultraviolet ray receiving surface of the ultraviolet ray detecting unit 601 is also facing the sun (the light source) (the sunlight is present on the front surface of the light receiving surface) based on the detection result by the light detecting unit 602 (the output voltage of the light detecting unit 602).

Additionally, the ultraviolet ray measuring apparatus 600 measures the ultraviolet intensity in a case in which the CPU 101 determines that the ultraviolet ray receiving surface of the ultraviolet ray detecting unit 601 is facing the sun (a light source) (the sunlight is present on the front surface of the light receiving surface), and, in other cases, does not measure ultraviolet intensity. Therefore, the ultraviolet ray measuring apparatus 600 can measure ultraviolet intensity accurately.

In addition, the ultraviolet ray measuring apparatus 600 outputs sound which notifies the user that the measurement of ultraviolet intensity has been normally finished or ultraviolet intensity has not been measured. Thereby, the user can verify whether or not measurement has been performed through the sound even in a case in which it is difficult to check the display on the display unit 108 when the ultraviolet ray measuring apparatus 600 faces the sun.

In addition, since the predetermined threshold value is a value which can be used to determine that direct sunlight hits the light receiving surface of the light detecting unit 602 head-on, the ultraviolet ray measuring apparatus 600 perform a display showing that the amount of ultraviolet rays is low and remains at a level of no damage to the human body, and therefore the measurement of ultraviolet rays is not performed in a case in which the ultraviolet ray measuring apparatus 600 does not measure ultraviolet intensity when it is little cloudy or the like.

Meanwhile, all or part of the functions by each component included in the ultraviolet ray measuring apparatus 600 in the above embodiments may be realized by recording programs for realizing such functions in a computer-readable recording medium, and reading and executing the program recorded in the recording medium via a computer system. Here, the "computer system" includes hardware, such as an operating system, a peripheral device or the like.

In addition, the "computer-readable recording medium" refers to a transportable medium, such as a flexible disc, a magneto-optical disc, a ROM, a CD-ROM or the like, and a storage unit embedded in a computer, such as a hard disk or the like. Furthermore, the "computer-readable recording medium" may also include an object that dynamically holds a program for a short period of time, such as communication wires when transmitting the program via a network circuit, such as the Internet or the like, or a communication line, such as a telephone line or the like, or an object that holds a program at a certain point in time, such as a volatile memory inside a computer system, which becomes a server or a client in such a case. In addition, the program may be an object for realizing a part of the above functions or may by an object that can realize the above functions by combining with a program already recorded in a computer.

Thus far, the tenth embodiment of the invention has been described, but the invention is not limited thereto, and a variety of modifications can be added within the scope of the invention. For example, the configuration used to determine whether or not the ultraviolet ray receiving surface of the ultraviolet ray detecting unit 601 is facing the sun (a light source) (the sunlight is present on the front surface of the light receiving surface) is not limited to the above configuration. For example, the configuration may be the configuration shown in FIG. 23.

Figure 23:
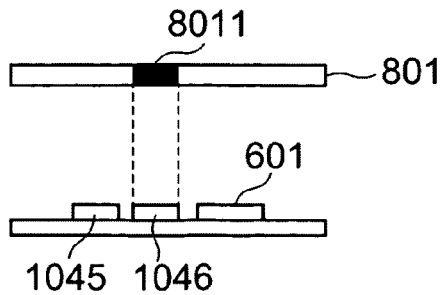
FIG. 23 is a schematic view showing an example of the disposition of the ultraviolet ray detecting unit and the light detecting unit included in the ultraviolet ray measuring apparatus according to the tenth embodiment of the invention.

FIG. 23 is a schematic view showing the disposition of the ultraviolet ray detecting unit 601 and the light detecting unit 602 included in the ultraviolet ray measuring apparatus 600. In the example shown in the drawing, the ultraviolet ray measuring apparatus 600 is provided with the ultraviolet ray detecting unit 601, a first light receiving surface 1045 and a second light receiving surface 1046 of the light detecting unit 602 and a light (sunlight or ultraviolet ray)-permeable cover glass 801. Here, a part of area (area 8011) in the cover glass 801 is processed to be light (sunlight or ultraviolet ray)-impermeable.

In the ultraviolet ray measuring apparatus 600, the ultraviolet ray detecting unit 601 and the light detecting unit 602 are disposed so that the ultraviolet ray receiving surface of the ultraviolet ray detecting unit 601, the first light receiving surface 1045 and the second light receiving surface 1046 of the light detecting unit 602 face in the same direction (or in almost the same direction). In addition, the area 8011 in the cover glass 801, which is disposed above the second light receiving surface 1046, is processed to be light (sunlight or ultraviolet ray)-impermeable so that light irradiated to the first light receiving surface 1045 is not blocked and light irradiated to the second light receiving surface 1046 is blocked only in a case in which the first light receiving surface 1045 and the second light receiving surface 1046 of the light detecting unit 602 face the sun (a light source) (only in a case in which the sunlight is present on the front surface of the light receiving surface).

With this configuration, the first light receiving surface 1045 detects high intensity light and the second light receiving surface 1046 does not detect high intensity light only in a case in which the first light receiving surface 1045 and the second light receiving surface 1046 face the sun (a light source). In addition, in a case in which the first light receiving surface 1045 detects high intensity light and the second light receiving surface 1046 does not detect high intensity light, the ultraviolet ray receiving surface of the ultraviolet ray detecting unit 601, which is facing in the same direction (or in almost the same direction) as the first light receiving surface 1045 and the second light receiving surface 1046 of the light detecting unit 602, is also facing the light source (the sun). Thereby, the CPU 101 in the ultraviolet ray measuring apparatus 600 can determine whether or not the ultraviolet ray receiving surface of the ultraviolet ray detecting unit 601 is facing the sun (the light source) (the sunlight is present on the front surface of the light receiving surface) based on the detection result of light (the output voltage of the light detecting unit 602) by the light detecting unit 602 (the first light receiving surface 1045 and the second light receiving surface 1046).

In addition, for example, the ultraviolet ray measuring apparatus 600 is not limited to the shape shown in FIG. 18, and may have any shapes, such as a wristwatch type apparatus or the like. In addition, the ultraviolet ray measuring apparatus 600 may be incorporated into other electronic devices, such as pedometer or the like.

Eleventh Embodiment

Hereinafter, an electronic wristwatch equipped with an ultraviolet measuring function according to the eleventh embodiment of the invention will be described using the accompanying drawings. Further, in the drawings, the same parts are given the same reference number.

Figure 24:
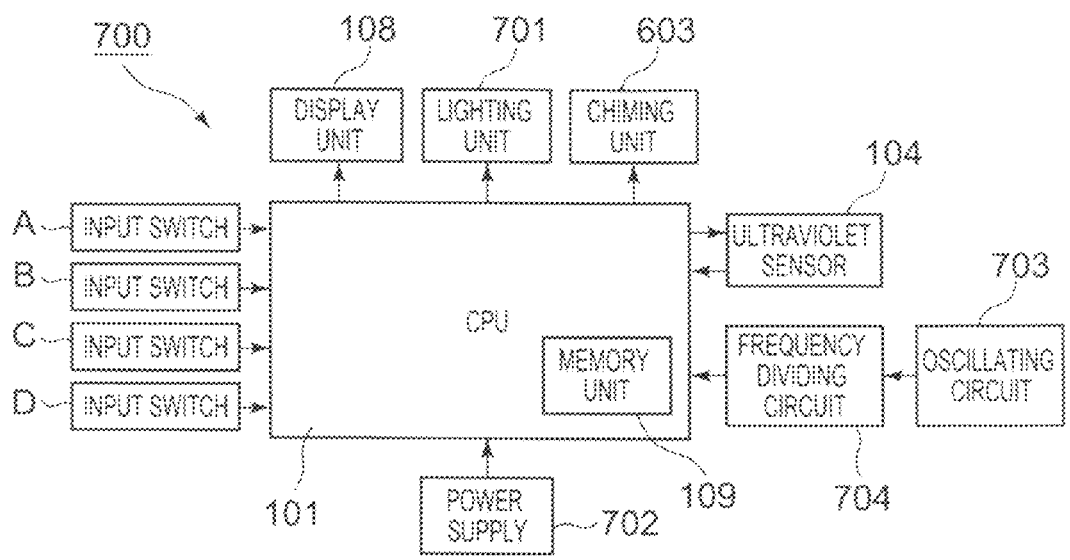
FIG. 24 is a block diagram of an electronic wristwatch equipped with an ultraviolet ray measuring function according to an eleventh embodiment of the invention.

FIG. 24 is a block diagram of the electronic wristwatch 700 equipped with an ultraviolet ray measuring function according to the eleventh embodiment.

In FIG. 24, the electronic wristwatch 700 equipped with an ultraviolet measuring function includes the Central Processing Unit (CPU) 101 having the memory unit 109, a plurality (four in the embodiment) of input switches A to D, the display unit 108, a lighting unit 701, the notification sound unit 603, the ultraviolet ray sensor 104, a power supply 702 that supplies a driving power to each of the electrical components, an oscillating circuit 703 and a frequency dividing circuit 704.

The memory unit 109 stores programs executed by the CPU 101 or stores a variety of data, such as measurement times, ultraviolet intensity or the like. The CPU 101 executes programs previously stored in the memory unit 109 so as to perform control of each component of the electronic wristwatch 700 equipped with an ultraviolet measuring function or perform processes to be described.

The input switches A to D are switches that can be operated by the user.

The ultraviolet ray sensor 104 outputs signals corresponding to ultraviolet intensity when ultraviolet ray is received, and the display unit 108 displays ultraviolet intensity measured by the ultraviolet ray sensor 104, points in time, amounts of time or the like recorded by the CPU 101.

The notification sound unit 603 notifies sound, such as time signals, and the light unit 701 lights the display unit 108 by the operation of the input switch B.

In addition, the oscillating circuit 703 generates signals with a predetermined frequency, and the frequency dividing circuit 704 divides the frequency of the signals from the oscillating circuit 703 so as to output clock signals which act as a reference for timekeeping operation. The CPU 101 counts the number of the clock signals so as to perform timekeeping operation called timekeeping of the current time or time measurement.

Here, the display unit 108 constitutes a display means, and the ultraviolet ray sensor 104 constitutes an ultraviolet intensity detecting means with the light receiving unit 203. The CPU 101 constitutes a timekeeping means and a control means. In addition the input switches A to D constitutes an input means.

The input means can give a command for, at least, timekeeping operation by the clock means.

The display means are disposed on the surface side, which forms the front in a state in which a main body 201 to be described below is attached to the arm, and can display at least time information recorded by the timekeeping means.

The ultraviolet intensity detecting means are disposed on the surface side of the main body 201.

The control means can set whether or not the command operations by the input means are set to work in cooperation with the ultraviolet intensity measurement by the ultraviolet intensity detecting means. The control means can display whether or not the command operations by the input means are set to work in cooperation with the ultraviolet intensity measurement by the ultraviolet intensity detecting means on the display means.

The input means includes a first, a second and a third input switches; the first input switch has a function that gives a command for switching operation modes, the second input switch has a function that gives a command for the start or stop of timekeeping in a state of displaying a stopwatch, the third input switch has a function that gives a command for the timekeeping of lap time or split time in a state in which the stopwatch performs timekeeping or a command for the resetting of measured values while the stopwatch is not in action, and, furthermore, among the first input switch, the second input switch and the third input switch, an input switch that has been set by the control means to work in cooperation with ultraviolet intensity measurement gives a command for ultraviolet intensity measurement in cooperation with the function possessed by the input switch.

The input means can include an input switch having a function that gives a command for ultraviolet intensity measurement and a function that gives a command whether or not a predetermined operation is set to work in cooperation with the ultraviolet intensity measurement.

In addition, an input switch set to work in cooperation with an ultraviolet intensity measurement command can be disposed at the right side of the ultraviolet intensity detecting means in a state in which the main body 201 is attached to the arm.

Figure 25:
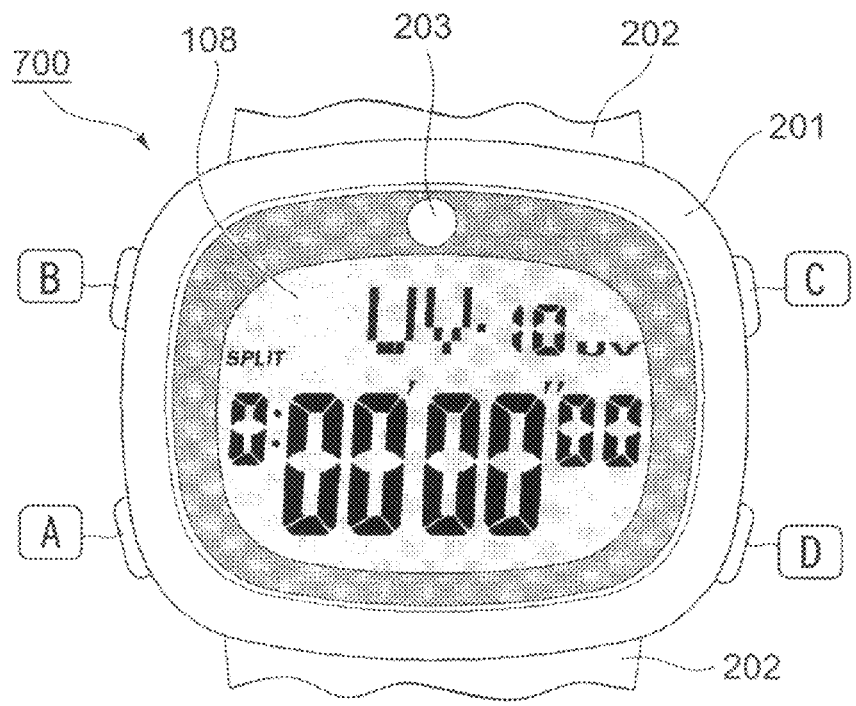
FIG. 25 is a front view showing the external appearance of the electronic wristwatch equipped with an ultraviolet ray measuring function according to the eleventh embodiment of the invention.

FIG. 25 is a front view showing the external appearance of the electronic wristwatch 700 equipped with an ultraviolet ray measuring function according to the embodiment. As shown in FIG. 25, the electronic wristwatch 700 equipped with an ultraviolet measuring function is an example of an electronic wristwatch equipped with an ultraviolet measuring function, which is used in a manner of being mounted on the left wrist.

The electronic wristwatch 700 equipped with an ultraviolet measuring function includes the main body 201 having an ultraviolet intensity measurement function and a timekeeping function and a band 202, a buckle (not shown) or the like for wearing the main body 201 on a wrist.

In the main body 201, the display unit 108 and the light receiving unit 203, which acts as a window that guides ultraviolet rays to the ultraviolet ray sensor 104, are disposed on the surface side that is visible in a state in which the main body 201 is mounted on the left wrist.

In FIG. 25, on the display unit 108, a recorded time is displayed in the center; a signal "SPLIT" is displayed in the 10 o'clock direction of the recorded time to show that the displayed time is a split time; a measured ultraviolet intensity value is displayed in the 12 o'clock direction of the recorded time; a cooperation signal "UV" is displayed in the 2 o'clock direction of the recorded time. The cooperation signal UV is a signal that indicates whether or not ultraviolet intensity measurement works in cooperation with a function possessed by the third input switch D. The cooperation signal UV is turned on in a case in which both functions are in cooperation (cooperation state) and is turned off in a case in which both functions are not in cooperation (non-cooperation state), and is turned on or off according to the state of cooperation.

In the electronic wristwatch 700 equipped with an ultraviolet measuring function, as shown in FIG. 25, the light receiving unit 203 is, similarly to the display unit 108, disposed on the surface of the main body 201 at 12 o'clock direction of the display unit 108. The ultraviolet ray sensor 104 is disposed at a place inside the main body 201, facing the light receiving unit 203, and, as described above, the light receiving surface 203 constitutes the ultraviolet ray measuring means with the ultraviolet ray sensor 104.

With such a configuration, when the user visually checks the display unit 108 with the electronic wristwatch mounted on the wrist, the electronic wristwatch 700 equipped with an ultraviolet measuring function (that is, the main body 201) is maintained almost horizontally, and therefore the ultraviolet ray sensor 104 is also maintained almost horizontally. As a result, ultraviolet rays pass through the light receiving unit 203 and is further satisfactorily received by the ultraviolet ray sensor 104.

Inside the main body 201, the CPU 101, the memory unit 109, the lighting unit 701, the notification sound unit 603, the ultraviolet ray sensor 104, the power supply 702, the oscillating circuit 703 and the frequency dividing circuit 704 are accommodated.

The main body 201 is provided with the first input switch A, the second input switch C, the third input switch D and the fourth input switch B in a protruding manner.

The fourth input switch B is a lighting input switch and may be omitted. The second and third switches C and D are disposed at the right side of the main body 201 (that is, the right side of the light receiving unit 203 (3 o'clock direction)), and therefore there is no case in which the light receiving unit 203 of the ultraviolet ray sensor 104 is covered and thus hidden by the right hand that is normally used when performing input operations. As a result, the ultraviolet ray sensor 104 can satisfactorily receive ultraviolet ray through the light receiving unit 203 even when performing input operations with the second and third switches C and D.

The first input switch A is a mode switch that switches operating functions, such as time display, stopwatch display, stopwatch-recorded data display, alarm setting time display or the like. In addition, it is possible to transfer to an adjustment mode, in which time or the like can be corrected, by holding the first input switch A ON for a fixed time period.

The second input switch C is a start/stop switch having a function of making the stopwatch start and stop timekeeping in a stopwatch-displayed state.

The third input switch D is a lap/reset switch that performs a function of recording lap times or split times during stopwatch timekeeping and resets timekeeping values to zero while the stopwatch is not in action. Here, the lap time indicates an amount of time from the start to a first intermediate point or an amount of time from an intermediate point to another intermediate point, and the split time indicates an amount of time from the start to each of the intermediate points.

In addition, the third input switch D has a function of being operated in a time-displayed state so as to start the measurement of ultraviolet intensity.

In addition, by holding the third input switch D ON for a fixed time period in a time-displayed state, whether or not to conjunct ultraviolet intensity measurement to a function possessed by the third input switch D in a stopwatch state can be switched.

The state of cooperation is displayed on the display unit 108 with the cooperation signal UV as described above.

As such, at least one input switch D of the input switches that work in cooperation with ultraviolet intensity measurement operation is disposed as if to locate at the right side of the light receiving unit 203 in a state in which the main body 201 is mounted on the left wrist. Thereby, the electronic wristwatch 700 equipped with an ultraviolet measuring function can measure ultraviolet intensity satisfactorily without being hidden by the shade of a hand operating the light receiving unit 203 even in a case in which the input switch D is operated to measure ultraviolet intensity.

Further, the second and third switches C and D may have a various configuration formats, such as a configuration in which the functions of the start of the stopwatch and intermediate time measurement are assigned to an input switch, and functions of the stop and resetting of the stopwatch are assigned to another input switch. That is, it is possible to have a configuration in which the second input switch C has a function that gives a command for the start or stop of timekeeping in a stopwatch-displayed state and the third input switch D has a function that gives a command for recording lap times or split times in a stopwatch measuring state or gives a command for resetting the measured value while the stopwatch is not in action.

Figure 27:
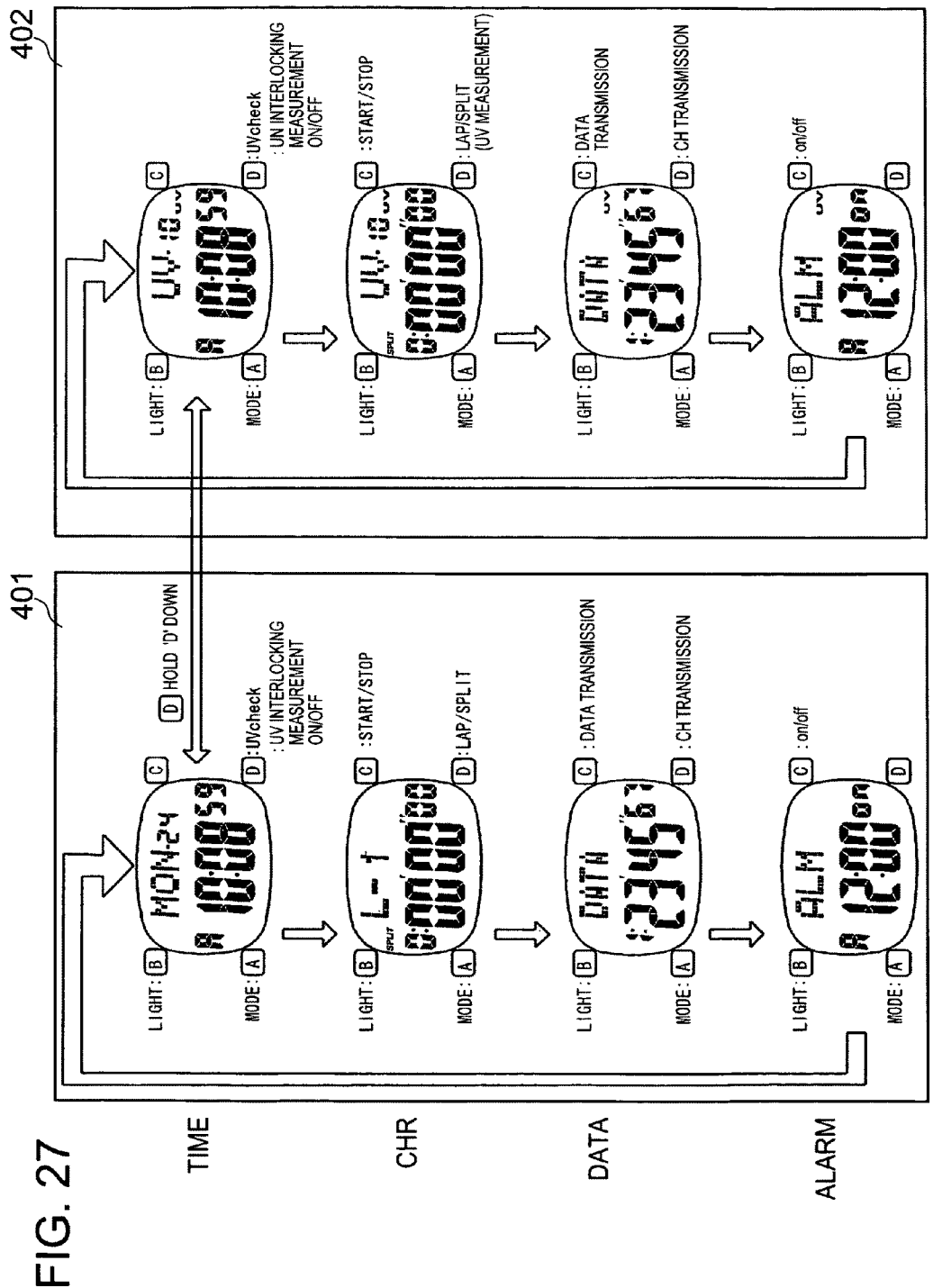
FIG. 27 is a view explaining the operations of the electronic wristwatch equipped with an ultraviolet ray measuring function according to the eleventh embodiment of the invention.

FIG. 27 is an explanatory view showing that operation modes are switched and the display on the display unit 108 is varied according to the operations of the electronic wristwatch 700 equipped with an ultraviolet measuring function.

In FIG. 27, a state 401 shows a case in which ultraviolet intensity measurement function does not work in cooperation with the function possessed by the third input switch D (non-cooperation state), and a state 402 shows a case in which ultraviolet intensity measurement function works in cooperation with the function possessed by the third input switch D (cooperation state).

In the non-cooperation state 401, each time the first input switch A is pressed, a time mode (TIME), in which time is measured and displayed, is switched to a stopwatch mode (CHR), in which lap times or split times are measured, a data display mode (DATA), in which measured lap times or the like are displayed, an alarm mode (ALARM), in which alarm times or the like are displayed, and the time display mode (TIME) in this order.

In the time mode (TIME), the measurement of ultraviolet intensity is performed by pressing the third input switch D for a short amount of time.

In addition, in the time mode (TIME) in the non-cooperation state 401, by continuously pressing the third input switch D for a predetermined amount of time or longer, the CPU 101 switches the non-cooperation state 401 to the cooperation state 402. The CPU 101 performs control to display the cooperation signal UV on the display unit 108 in a case in which the non-cooperation state 401 is switched to the cooperation state 402.

In the stopwatch mode (CHR), the second input switch C functions as an input switch that gives a command for the start/stop of time measurement, and the third input switch D functions as an input switch for giving a command for lap/split points in time.

On the other hand, even in the cooperation state 402, each time the first input switch A is pressed, similarly to the non-cooperation state 401, the time mode (TIME) is switched to the stopwatch mode (CHR), the data display mode (DATA), the alarm mode (ALARM) and the time display mode (TIME) in this order.

In the time mode (TIME), the measurement of ultraviolet intensity is performed by pressing the third input switch D for a short amount of time only.

In addition, in the time mode (TIME) in the cooperation state 402, by continuously pressing the third input switch D for a predetermined amount of time or longer, the CPU 101 switches the cooperation state 402 to the non-cooperation state 401. The CPU 101 performs control to turn the cooperation signal UV off on the display unit 108 in a case in which the cooperation state 402 is switched to the non-cooperation state 401.

In the stopwatch mode (CHR) in the cooperation state 402, similarly to the non-cooperation state 401, the second input switch C functions as an input switch that gives a command for the start/stop of time measurement, but the third input switch D, different from the function in the non-cooperation state 401, functions as an input switch for giving a command for lap/split points in time and also as an input switch that gives a command for ultraviolet intensity measurement.

That is, in the stopwatch mode (CHR) in the cooperation state 402, each time the third input switch D is pressed, lap/split points in time are commanded and also the intensity of ultraviolet rays received through the light receiving unit 203 is measured by the ultraviolet ray sensor 104 and displayed on the display unit 108.

Figure 26:
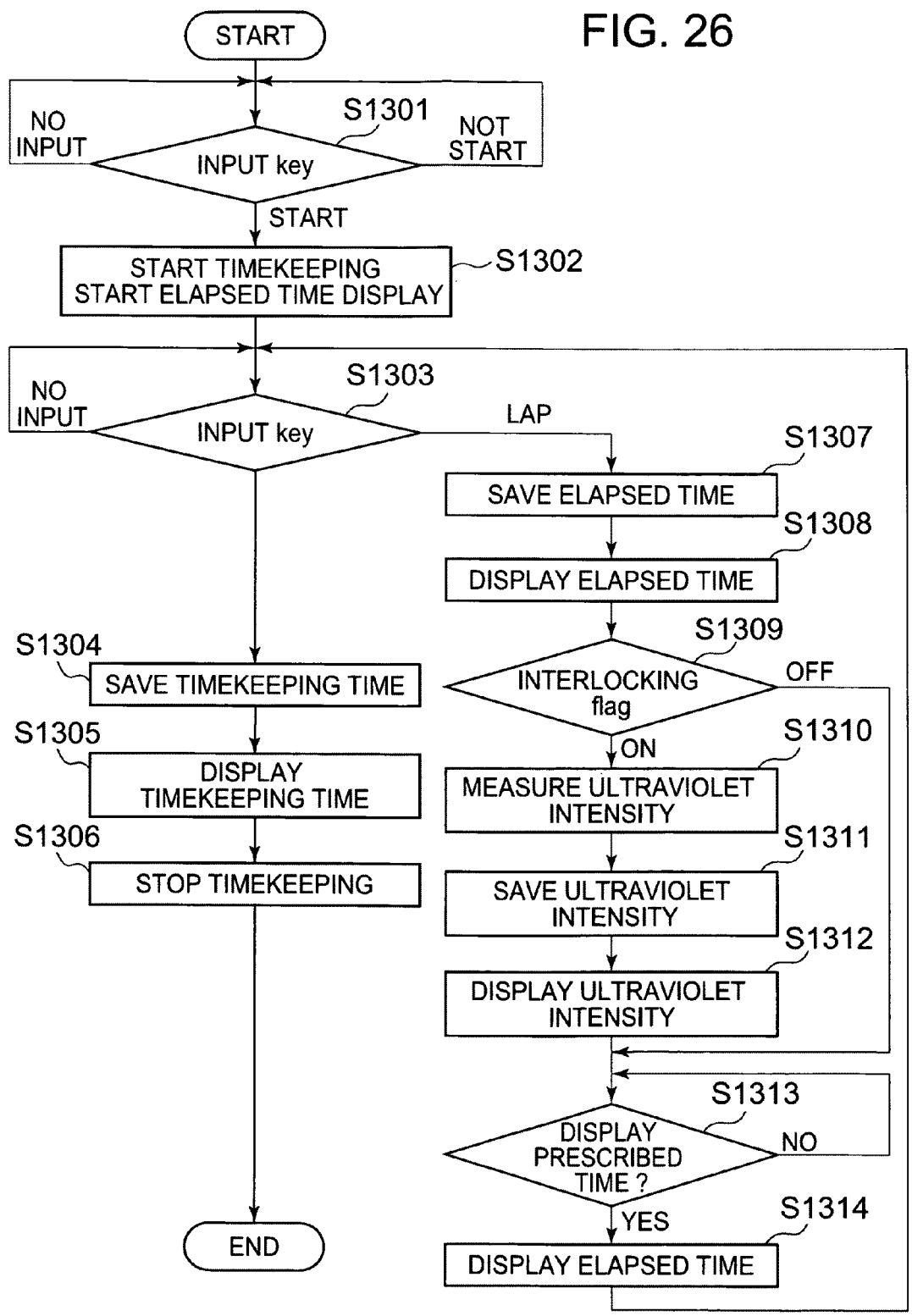
FIG. 26 is a flowchart showing the electronic wristwatch equipped with an ultraviolet ray measuring function according to the eleventh embodiment of the invention.

FIG. 26 is a flowchart showing the processes of the electronic wristwatch equipped with an ultraviolet ray measuring function according to the eleventh embodiment, and mainly shows the processes that the CPU 101 performs by executing programs stored in the storage unit 109.

A state in which the electronic wristwatch 700 equipped with an ultraviolet measuring function is used with the functions possessed by the third input switch D and ultraviolet intensity measurement function in a cooperation state will be described with an example of marathon based on FIG. 26.

The CPU 101 performs timekeeping operation based on the clock signals from the frequency dividing circuit 704 and records the current time.

Firstly, in the time mode (TIME) in the non-cooperation state 401, the input switch D is continuously operated to be ON for a predetermined amount of time, and the function possessed by the third input switch D and ultraviolet intensity measurement function are set to be in the cooperation state 402. At this time, the CPU 101 turns ON an ultraviolet measurement cooperation flag showing that the apparatus is in the cooperation state 402. The cooperation signal UV is displayed on the display unit 108.

In the time mode (TIME) in the cooperation state 402, the first input switch A is operated so as to transfer to the stopwatch mode (CHR).

In this state, the stopwatch clock is started by an operation of the input switch C. If the CPU 101 determines that the input switch C has been operated in the stopwatch mode (CHR) (Step S1301 in FIG. 26), the CPU 101 starts the clock operation of the stopwatch and displays elapsed times on the display unit 108 (Step S1302).

In order to measure times at intermediate points, such as 1 km, 5 km or the like, the user extends the left arm, on which the electronic wristwatch 700 equipped with an ultraviolet measuring function is mounted, ahead of the chest and operates the third input switch D in this state so as to perform the measurement of lap times or split times, and looks at the display unit 108.

If the CPU 101 determines that the third input switch D is operated (a measurement operation of lap time or split time) (Step S1303), the CPU 101 saves the measurement time when the third input switch D has been operated (lap time or split time) in the memory unit 109 (Step S1307) and displays the measured time on the display unit 108 (Step S1308).

The CPU 101 turns the ultraviolet measurement cooperation flag ON. That is, if it is determined that the function possessed by the third input switch D and ultraviolet intensity measurement function are in the cooperation state 402 (Step S1309), the CPU 101 measures the intensity of ultraviolet rays received by the ultraviolet ray sensor 104 through the light receiving unit 203 (Step S1310), saves the measured value of the ultraviolet intensity in the memory unit 109 (Step S1311), and displays the measured value of the ultraviolet intensity on the display unit 108 (Step S1312).

The CPU 101 displays the measured value of the ultraviolet intensity with a prescribed time (Step S1313), and then displays an elapsed time from the start or an elapsed time from the lap measurement on the display unit 108 (Step S1314), and returns to the process step S1303, and then awaits for the next input.

If the ultraviolet measurement cooperation flag is On in the process step S1309, the CPU 101 displays the measured lap or split value for a fixed time period without performing ultraviolet intensity measurement (Steps S1313 and S1314), and then displays an elapsed time from the start or an elapsed time from the lap measurement on the display unit 108 (Step S1314), and returns to the process step S1303, and then awaits for the next input.

If the CPU 101 detects that the second input switch C has been operated (stop operation) in the process step S1303, the CPU 101 saves times that have been measured up to that time in the memory unit 109 (Step S1304), and displays the measured times on the display unit 108 (Step S1305), and stops the clock operation (Step S1306).

The CPU 101 multiplies the ultraviolet intensity measured in the above manner by the cumulative times when ultraviolet ray has been measured so as to calculate the cumulative amount of ultraviolet ray received. The cumulative amount of ultraviolet ray received is displayed on the display unit 108 as a response to a user's operation in the data display mode (DATA).

As such, when having performed the measurement operation of lap times or split times, the user maintains the main body 201 almost horizontally as a natural move to visually check the display unit 108 of the electronic wristwatch 700 equipped with an ultraviolet measuring function.

Since the electronic wristwatch 700 equipped with an ultraviolet measuring function performs ultraviolet intensity measurement in cooperation with the measurement operation of lap times or split times by the operation of the third input switch D, ultraviolet intensity measurement is performed in a state in which the orientation of the main body 201 is maintained almost horizontally (in a state in which the ultraviolet ray receiving surface of the ultraviolet ray sensor 104 faces in a predetermined direction), and therefore it is possible to suppress at a low level the accuracy degradation due to the direction of the main body 201 at each ultraviolet intensity measurement.

In addition, in a case in which sports activities last for a long time outdoors, the cumulative amount of ultraviolet rays received becomes an important index, and, according to the electronic wristwatch 700 equipped with an ultraviolet measuring function according to the embodiment, it is possible to accurately measure the cumulative amount of ultraviolet rays received.

As described above, the electronic wristwatch 700 equipped with an ultraviolet measuring function according to the embodiment is the electronic wristwatch 700 equipped with an ultraviolet measuring function, the main body 201 of which having an ultraviolet intensity measuring function and a clock function is mounted and used on the arm, including the display unit 108, which is disposed on the surface side which forms the front in a state in which the main body 201 is attached to the arm, and displays time information kept by the timekeeping means, the ultraviolet ray sensor 104 that measures the intensity of ultraviolet rays incident from the light receiving unit 203 disposed in the surface side, the timekeeping means that performs a timekeeping operation, the input switch D that gives at least a command for the timekeeping operation by the timekeeping means, and the control means that switches whether or not the command operation by the input switch D is set to work in cooperation with the ultraviolet intensity measurement operation of the ultraviolet ray sensor 104.

Therefore, it is possible to suppress the degradation in ultraviolet measurement accuracy due to the orientation of the electronic wristwatch 700 equipped with an ultraviolet measuring function.

In addition, since the orientation of the electronic wristwatch 700 equipped with an ultraviolet measuring function remains in a proper orientation for the measurement of ultraviolet rays even during walking, it is possible to accurately measure ultraviolet intensity. That is, since the display unit 108 faces upward in order for the user to visually check the display on the display unit 108 when performing an operation, and ultraviolet intensity measurement is set to work in cooperation with the switch operations other than the start of ultraviolet ray measurement and therefore the window unit 203 that guides ultraviolet rays to the ultraviolet ray sensor 104 during the measurement also remains upward at all times, it is possible to prevent accuracy degradation due to the orientation of the ultraviolet ray sensor 104.

In addition, in the case of sports performed together with timekeeping, such as the marathon or the like, since the measurement operation of lap times and split times are performed at substantially similar amounts of time, it is possible to measure a cumulative value similar to a value by a continuous measurement, which indicates what amount of ultraviolet rays has been received in total.

In addition, by setting the measurement function of lap times or split times and ultraviolet intensity measurement function to work in cooperation with the same switch, in the case of sports performed outdoor for a long time, such as the marathon or the like, the orientation of the electronic wristwatch 700 equipped with an ultraviolet measuring function remains the same and performs the measurement operation at substantially similar amount of time during each measurement, and therefore it is possible to measure the cumulative value similar to a value by a continuous measurement, which indicates what amount of ultraviolet ray has been received in total.

In addition, since the measurement function and ultraviolet intensity measurement function are set to work in cooperation, an effect of making operation simple can be attained.

Twelfth Embodiment

Figure 28:
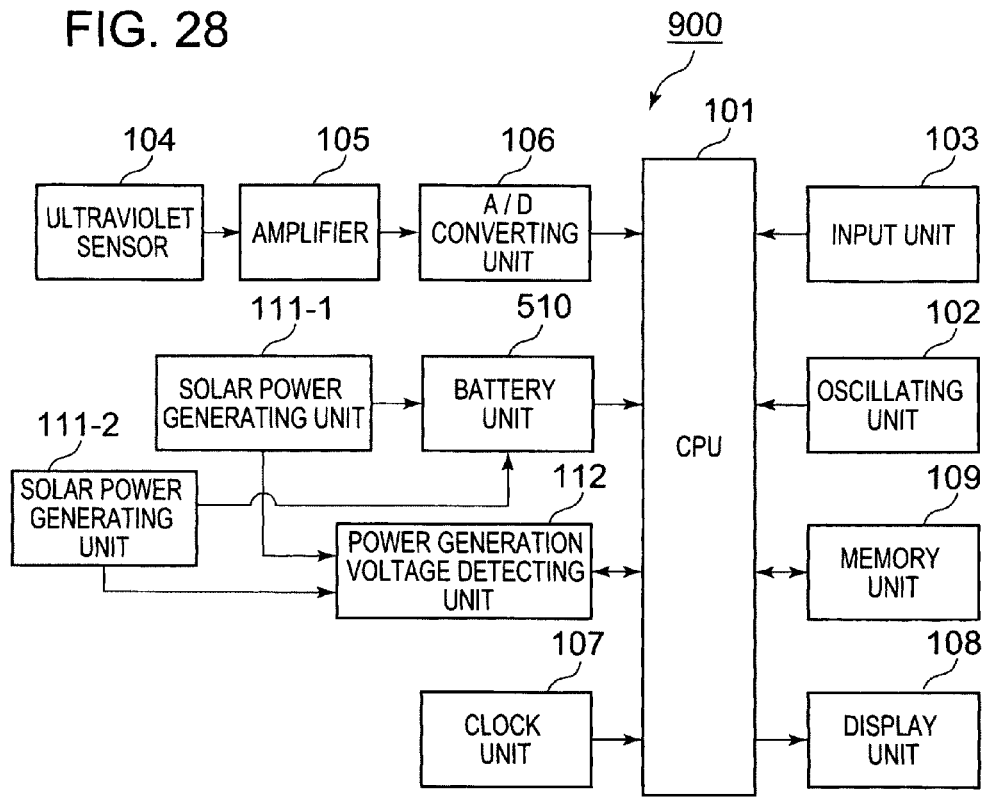
FIG. 28 is a block diagram showing the configuration of an ultraviolet ray measuring apparatus according to a twelfth embodiment of the invention.

Hereinafter, the twelfth embodiment of the invention will be described with reference to the accompanying drawings. FIG. 28 is a block diagram showing the configuration of an ultraviolet ray measuring apparatus according to the twelfth embodiment. In the example shown in the drawing, an ultraviolet ray measuring apparatus 900 includes the CPU 101 (Central Processing Unit, the control unit), the oscillating unit 102, the input unit 103, the ultraviolet ray sensor 104, the amplifying unit 105, the analog-digital (A/D) converting unit 106, the clock unit 107, the display unit 108, the memory unit 109, the battery unit 510, solar power generation units 111-1 and 111-2 (a first solar power generation unit and a second solar power generation unit) and the power generation voltage detecting unit 112.

The CPU 101 performs the control of each of the units included in the ultraviolet ray measuring apparatus 900. The oscillating unit 102 outputs reference clock signals for the CPU 101 or clock signals for timekeeping. The input unit 103 is configured with externally operable switches and receives input. The ultraviolet ray sensor 104 includes an ultraviolet ray receiving surface that receives ultraviolet rays and outputs analog signals corresponding to the intensity of ultraviolet rays received (irradiated). The amplifying unit 105 amplifies analog signals output by the ultraviolet ray sensor 104. The A/D converting unit 106 converts analog signals amplified by the amplifying unit 105 to digital signals. The clock unit 107 outputs information showing the current date and time. The display unit 108 displays information showing the intensity of ultraviolet rays measured by the ultraviolet ray sensor 104 (measured values ($\mu W/cm^2$), UV index or the like), the date and time or the like.

The memory unit 109 refers to a Read Only Memory (ROM), a Random Access Memory (RAM) or the like, and stores data used by the ultraviolet ray measuring apparatus 900, such as programs executed by the CPU 101, the intensity of ultraviolet rays measured, the times when the intensity of ultraviolet rays is measured, or the like. The battery unit 510 is a chargeable secondary battery that supplies power to each of the units included in the ultraviolet ray measuring apparatus 900. The solar power generation units 111-1 and 111-2 are solar cells including a light receiving surface that receives light and generates power according to the received (irradiated) light and charges the battery unit 510. The power generation voltage detecting unit 112 (a generated power amount measuring unit) detects voltages generated by the solar power generation units 111-1 and 111-2 (generated power amount).

Figure 29:
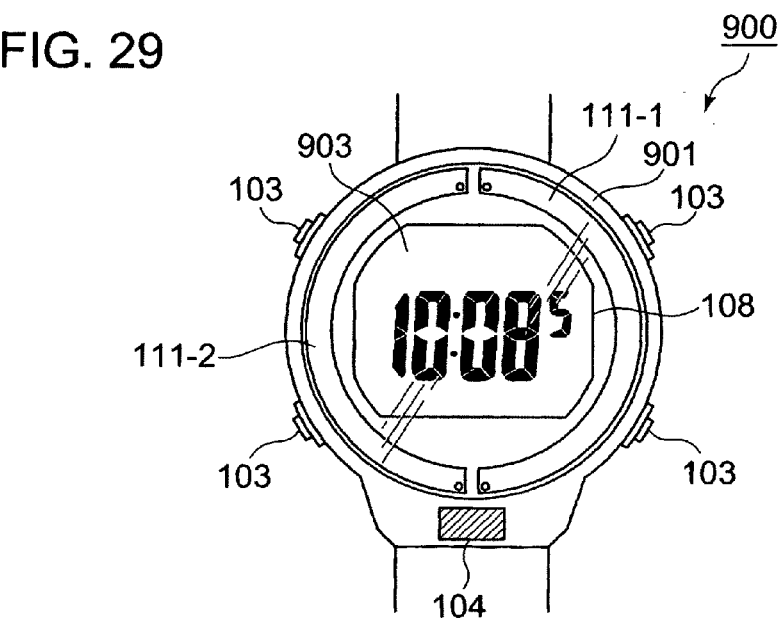
FIG. 29 is a view showing the external appearance of the ultraviolet ray measuring apparatus according to the twelfth embodiment of the invention.

Next, the external appearance of the ultraviolet ray measuring apparatus 900 according to the twelfth embodiment will be described. FIG. 29 is a view showing the external appearance of the ultraviolet ray measuring apparatus 900 according to this embodiment. In the example shown in the drawing, the ultraviolet ray measuring apparatus 900 is a wristwatch type apparatus, and the input unit 103, the ultraviolet ray sensor 104, the solar power generation units 111-1 and 111-2, the display unit 108, and a cover glass 903 are disposed at the surface of an exterior case 901 in the ultraviolet ray measuring apparatus 900. In detail, the ultraviolet ray sensor 104 and the solar power generation units 111-1 and 111-2 are disposed on the front surface of the exterior case 901 of the ultraviolet ray measuring apparatus 900 so that the ultraviolet ray receiving surface of the ultraviolet ray sensor 104 and the light receiving surfaces (the first light receiving surface and the second light receiving surface) of the solar power generation units 111-1 and 111-2 face in the same direction (or in almost the same direction). In addition, the display unit 108 is disposed on the front surface of the exterior case 901 of the ultraviolet ray measuring apparatus 900, and the input unit 103 is disposed on a side surface of the exterior case 901 of the ultraviolet ray measuring apparatus 900. In addition, the cover glass 903 is disposed at the front surface of the exterior case 901 so that the display unit 108 and the solar power generation units 111-1 and 111-2 are covered.

Figure 30:
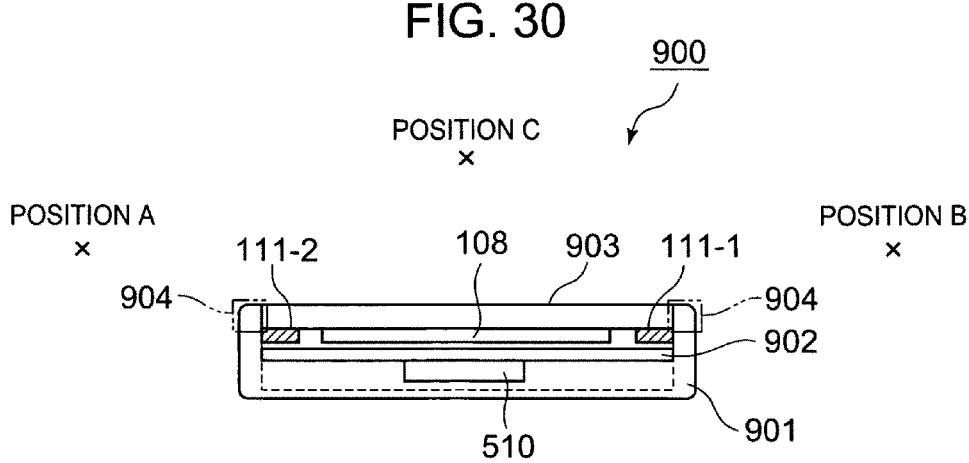
FIG. 30 is a cross-sectional view of the ultraviolet ray measuring apparatus according to the twelfth embodiment of the invention.

Next, the disposition of the solar power generation units 111-1 and 111-2 included in the ultraviolet ray measuring apparatus 900 according to the embodiment will be described. FIG. 30 is a cross-sectional view of the ultraviolet ray measuring apparatus 900 according to the embodiment. In the example shown in the drawing, the exterior case 901 of the ultraviolet ray measuring apparatus 900 is provided with the solar power generation units 111-1 and 111-2, the display unit 108, the cover glass 903, the battery unit 510 and a substrate 902.

An outer circumferential unit 904 of the exterior case 901 is taller than the light receiving surface of the solar power generation units 111-1 and 111-2. In addition, the solar power generation units 111-1 and 111-2 are disposed along the inside of the outer circumferential unit 904 of the exterior case 901. In the example shown in the drawing, the solar power generation unit 111-1 is disposed along the right side of the exterior case 901 and the inside of the outer circumferential unit 904, and the solar power generation unit 111-2 is disposed along the left side of the exterior case 901 and the inside of the outer circumferential unit 904.

Therefore, in a case in which the sun is located inclined at the left of the exterior case (for example, the location A in the drawing), all of the light from the sun is irradiated to the solar power generation unit 111-1, but, since the outer circumferential unit 904 of the exterior case 901 is present at the left side of the solar power generation unit 111-2, a part of the light from the sun is blocked by the outer circumferential unit 904, and not all of the light from the sun is irradiated to the solar power generation unit 111-2. As a result, the amount of power generated by the solar power generation unit 111-2 is lower than the amount of power generated by the solar power generation unit 111-1. In addition, in a case in which the sun is located inclined at the right of the exterior case (for example, the location B in the drawing), all of the light from the sun is irradiated to the solar power generation unit 111-2, but, since the outer circumferential unit 904 of the exterior case 901 is present at the left side of the solar power generation unit 111-1, a part of the light from the sun is blocked by the outer circumferential unit 904, and not all of the light from the sun is irradiated to the solar power generation unit 111-1. As a result, the amount of power generated by the solar power generation unit 111-1 is lower than the amount of power generated by the solar power generation unit 111-2.

In addition, in a case in which the sun is located above the exterior case (for example the location C in the drawing), all of the light from the sun is irradiated to the solar power generation units 111-1 and 111-2 without being blocked by the outer circumferential unit 904 of the exterior case 901. As a result, the amount of power generated by the solar power generation unit 111-1 becomes identical to the amount of power generated by the solar power generation unit 111-2.

That is, the solar power generation units 111-1 and 111-2 are disposed in the ultraviolet ray measuring apparatus 900 so that all of the light from the sun is irradiated to both solar power generation units 111-1 and 111-2 without being blocked by the outer circumferential unit 904 of the exterior case 901 only in a case in which the light receiving surfaces in the solar power generation units 111-1 and 111-2 face the sun.

With this configuration, the amount of power generated by the solar power generation unit 111-1 and the amount of power generated by the solar power generation unit 111-2 become identical only in a case in which the light receiving surfaces in the solar power generation units 111-1 and 111-2 face the sun (a light source). Therefore, if the amount of power generated by the solar power generation unit 111-1 and the amount of power generated by the solar power generation unit 111-2 become identical, the light receiving surfaces in the solar power generation units 111-1 and 111-2 are facing the sun. In addition, since the light receiving surfaces in the solar power generation units 111-1 and 111-2 and the ultraviolet ray receiving surface of the ultraviolet ray sensor 104 are facing in the same direction (or in almost the same direction), if the amount of power generated by the solar power generation unit 111-1 and the amount of power generated by the solar power generation unit 111-2 become identical, it can be determined that the ultraviolet ray receiving surface of the ultraviolet ray sensor 104 is facing the sun (the sunlight is present on the front surface of the light receiving surface), and, if the amount of power generated by the solar power generation unit 111-1 and the amount of power generated by the solar power generation unit 111-2 are different, it can be determined that the ultraviolet ray receiving surface of the ultraviolet ray sensor 104 is not facing the sun (the sun is not present on the front surface of the light receiving surface).

Figure 31:
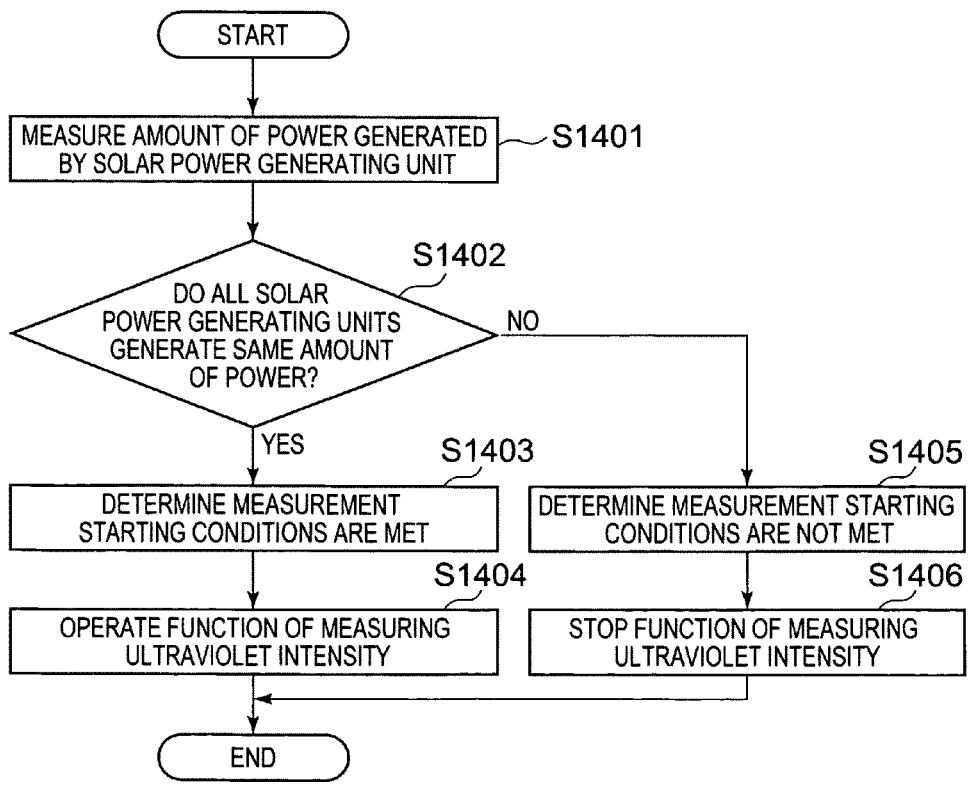
FIG. 31 is a flowchart showing the operations of the ultraviolet ray measuring apparatus according to the twelfth embodiment of the invention.

Next, the operations of the ultraviolet ray measuring apparatus 900 according to the embodiment will be described. FIG. 31 is a flowchart showing the operations of the ultraviolet ray measuring apparatus 900 according to the embodiment.

(Step S1401) The power generation voltage detecting unit 112 respectively measures the amount of power generated by the solar power generation unit 111-1 and the amount of power generated by the solar power generation unit 111-2 (power generation voltage). After that, the operation proceeds to the process in Step S1402. Meanwhile, in the embodiment, the power generation voltage is used as the amount of power generated, but the amount of power generated is not limited thereto. For example, any values may be used as long as they are varied according to the amount of power generated by the solar power generation unit 111-1 and 111-2, such as power generation current or the like.

(Step S1402) The CPU 101 determines whether or not the amount of power generated by the solar power generation unit 111-1 (power generation voltage) and the amount of power generated by the solar power generation unit 111-2 measured by the power generation voltage detecting unit 112 in Step S1401 are identical. In a case in which the CPU 101 determines that the amount of power generated by the solar power generation unit 111-1 (power generation voltage) and the amount of power generated by the solar power generation unit 111-2 measured by the power generation voltage detecting unit 112 are identical, the operation proceeds to the process in Step S1403, and, in other cases, the operation proceeds to the process in Step S1405. Meanwhile, in consideration of an error in the amounts of power generated by the solar power generation units 111-1 and 111-2 or an error in the measurement by the power generation voltage detecting unit 112, if the error in the amounts of power generated by the solar power generation units 111-1 and 111-2 is within a predetermined threshold value, the CPU 101 determines that the amount of power generated by the solar power generation unit 111-1 (power generation voltage) and the amount of power generated by the solar power generation unit 111-2 are identical. That is, the identical value also includes the almost identical values. Here, the predetermined threshold value may be determined in advance according to the characteristics of the solar power generation units 111-1 and 111-2 or the power generation voltage detecting unit 112 or may be arbitrarily determined.

(Step S1403) The CPU 101 determines that the conditions for the start of the measurement of ultraviolet intensity are satisfied. After that, the operation proceeds to the process in Step S1404.

(Step S1404) The CPU 101 activates the function of measuring ultraviolet intensity. After that, the operation is finished. In detail, the CPU 101 activates the ultraviolet ray sensor 104, the amplifying unit 105 and the A/D converting unit 106. Thereby, the ultraviolet ray sensor 104 outputs analog signals corresponding to the ultraviolet intensity, and the amplifying unit 105 amplifies the analog signals output by the ultraviolet ray sensor 104, and the A/D converting unit 106 converts the analog signals amplified by the amplifying unit 105 to digital signals.

(Step S1405) The CPU 101 determines that the conditions for the start of the measurement of ultraviolet intensity are not satisfied. After that, the operation proceeds to the process in Step S1406.

(Step S1406) The CPU 101 stops the function of measuring ultraviolet intensity. After that, the operation is finished. In detail, the CPU 101 stops the ultraviolet ray sensor 104, the amplifying unit 105 and the A/D converting unit 106. Thereby, it is possible to suppress power consumed by the ultraviolet ray sensor 104, the amplifying unit 105 and the A/D converting unit 106.

As described above, according to this embodiment, the ultraviolet ray measuring apparatus 900 determines whether or not the ultraviolet ray receiving surface of the ultraviolet ray sensor 104 is facing the sun based on the amounts of power generated by the solar power generation units 111-1 and 111-2, and, in a case in which the ultraviolet ray receiving surface of the ultraviolet ray sensor 104 is facing the sun, activates the function of measuring ultraviolet intensity, and, in other cases, stops the function of measuring ultraviolet intensity.

Thereby, it is possible to make the ultraviolet ray measuring apparatus 900 automatically perform the measurement of ultraviolet rays without a user's operation for measuring ultraviolet intensity in a case in which the ultraviolet ray receiving surface of the ultraviolet ray sensor 104 is facing the sun. In addition, since the ultraviolet ray measuring apparatus 900 performs the measurement of ultraviolet rays in a case in which the ultraviolet ray receiving surface of the ultraviolet ray sensor 104 is facing the sun, it is possible to further accurately measure ultraviolet intensity. Furthermore, in a case in which the ultraviolet ray receiving surface of the ultraviolet ray sensor 104 is not facing the sun, since the ultraviolet ray measuring apparatus 900 automatically stops the measurement of ultraviolet rays, it is possible to reduce power consumption.

Meanwhile, all or part of the functions by each component included in the ultraviolet ray measuring apparatus 900 in the above embodiment may be realized by recording programs for realizing such functions in a computer-readable recording medium, and reading and executing the program recorded in the recording medium via a computer system. Here, the "computer system" includes hardware, such as an operating system, a peripheral device or the like.

In addition, the "computer-readable recording medium" refers to a transportable medium, such as a flexible disc, a magneto-optical disc, a ROM, a CD-ROM or the like, and a storage unit embedded in a computer, such as a hard disk or the like. Furthermore, the "computer-readable recording medium" may also include an object that dynamically holds a program for a short amount of time, such as communication wires when transmitting the program via a network circuit, such as the Internet or the like, or a communication line, such as a telephone line or the like, or an object that holds a program at a certain point in time, such as a volatile memory inside a computer, which becomes a server or a client in such a case. In addition, the program may be an object for realizing a part of the above functions or may by an object that can realize the above functions by combining with a program already recorded in a computer.

Thus far, the twelfth embodiment of the invention has been described, but the invention is not limited to the embodiment, and a variety of modifications can be added within the scope of the invention. For example, the ultraviolet ray measuring apparatus 900 includes two solar power generation units 111-1 and 111-2, but the invention is not limited thereto and may include three or more solar power generation units. In this case, it is necessary to dispose the solar power generation units in the ultraviolet ray measuring apparatus 900 so that, only in a case in which the light receiving surfaces of all solar power generation units included in the ultraviolet ray measuring apparatus 900 are facing the sun, the amount of power generated by each of the solar power generation units becomes identical. In addition, it is necessary to dispose the ultraviolet ray sensor 104 and each of the solar power generation units in the ultraviolet ray measuring apparatus 900 so that the ultraviolet ray receiving surface of the ultraviolet ray sensor 104 and the light receiving surface of each of the solar power generation units face in the same direction (or in almost the same direction).

In addition, the ultraviolet ray measuring apparatus 900 in the embodiment was a wristwatch type apparatus, but the invention is not limited thereto and may be a small size apparatus which can be easily carried. In addition, the ultraviolet ray measuring apparatus 900 may be incorporated into other electronic devices, such as a pedometer or the like.

What is claimed is:
1. An ultraviolet ray measuring apparatus, comprising:
an ultraviolet ray sensor that measures the ultraviolet intensity of ultraviolet rays irradiated to an ultraviolet ray receiving surface; and a control unit that performs control to measure the ultraviolet intensity in a case in which the ultraviolet ray receiving surface of the ultraviolet ray sensor faces in a predetermined direction.

2. An ultraviolet ray measuring apparatus, comprising:
an ultraviolet ray sensor that measures the ultraviolet intensity of ultraviolet rays irradiated to an ultraviolet ray receiving surface;
an orientation detecting unit that detects the direction of the ultraviolet ray receiving surface;
a display unit that displays information showing the ultraviolet intensity measured by the ultraviolet ray sensor; and
a control unit that, based on the detection results of the orientation detecting unit, controls the ultraviolet ray sensor to measure the ultraviolet intensity in a case in which the ultraviolet ray receiving surface is determined to be facing upward and controls the ultraviolet ray sensor to stop the operation in a case in which the ultraviolet ray receiving surface is determined to not be facing upward.

3. An ultraviolet ray measuring apparatus according to claim 2, wherein the control unit activates the ultraviolet ray sensor for a fixed period at a fixed interval when controlling the ultraviolet ray sensor to measure the ultraviolet intensity.

4. An ultraviolet ray measuring apparatus according to claim 2, wherein the control unit performs the above control only in a case in which a fixed amount of time elapses after the ultraviolet ray sensor is controlled to measure the ultraviolet intensity.

5. An ultraviolet ray measuring apparatus according to claim 2, wherein the control unit performs the above control only in a case in which a fixed amount of time elapses after the ultraviolet ray sensor is controlled to measure the ultraviolet intensity or in which the previous ultraviolet intensity measured by the ultraviolet ray sensor is below a reference value, and a reference amount of time or longer elapses from the measurement.

6. An ultraviolet ray measuring apparatus, comprising:
an ultraviolet ray sensor that measures the ultraviolet intensity of ultraviolet rays irradiated to an ultraviolet ray receiving surface;
a light detecting unit that includes a light receiving surface disposed in the same or almost the same direction as the ultraviolet ray receiving surface and detects that the light receiving surface is facing a light source based on the intensity of light irradiated to the light receiving surface;
a display unit that displays information showing the ultraviolet intensity measured by the ultraviolet ray sensor; and
a control unit that controls the ultraviolet ray sensor to measure the ultraviolet intensity in a case in which the light detecting unit detects that the light receiving surface is facing a light source;
wherein the light detecting unit has a light impermeable material that is configured above the light receiving surface and that has a cylindrical light passage extending therethrough so that light is irradiated through the light passage to the light receiving surface without being blocked in a case in which the light receiving surface is facing a light source, and detects that the light receiving surface is facing a light source based on the intensity of light irradiated to the light receiving surface.

7. An ultraviolet ray measuring apparatus, comprising:
an ultraviolet ray sensor that measures the ultraviolet intensity of ultraviolet rays irradiated to an ultraviolet ray receiving surface;
a light detecting unit that includes a light receiving surface disposed in the same or almost the same direction as the ultraviolet ray receiving surface and detects that the light receiving surface is facing a light source based on the intensity of light irradiated to the light receiving surface;
a display unit that displays information showing the ultraviolet intensity measured by the ultraviolet ray sensor; and
a control unit that controls the ultraviolet ray sensor to measure the ultraviolet intensity in a case in which the light detecting unit detects that the light receiving surface is facing a light source;
wherein the light detecting unit includes a first light receiving surface and a second light receiving surface, both of which are disposed in the same or almost the same direction, and a light impermeable member disposed above the second light receiving surface so that, in a case in which the first light receiving surface and the second light receiving surface face a light source, light irradiated to the first light receiving surface is not blocked but light irradiated to the second light receiving surface is blocked, and detects that the first light receiving surface and the second light receiving surface face a light source in a case in which the intensity of light irradiated to the first light receiving surface is strong relative to the intensity of light irradiated to the second light receiving surface.

8. An ultraviolet ray measuring apparatus according to claim 6, further comprising a notification sound unit that outputs sound notifying whether or not the ultraviolet ray sensor has measured the ultraviolet intensity.

9. An ultraviolet ray measuring apparatus, comprising:
an ultraviolet ray sensor that measures the ultraviolet intensity of ultraviolet rays irradiated to an ultraviolet ray receiving surface;
a first solar power generation unit that generates power according to light irradiated to a first light receiving surface disposed in the same or almost the same direction as the ultraviolet ray receiving surface;
a second solar power generation unit that generates power according to light irradiated to a second light receiving surface disposed in the same or almost the same direction as the ultraviolet ray receiving surface;
an exterior case that, in a case in which a light source is present in a first direction which is a direction inclined with respect to the first light receiving surface, blocks a part of the light from the light source so that the part of the light is not irradiated to the first light receiving surface and, in a case in which a light source is present in a second direction, which is a direction inclined with respect to the second light receiving surface and different from the first direction, blocks a part of the light from the light source so that the part of the light is not irradiated to the second light receiving surface; and
a control unit that controls the ultraviolet ray sensor to measure the ultraviolet intensity in a case in which the power generated by the first solar power generation unit is identical to the power generated by the second solar power generation unit.

* * * * *